United States Patent
Lissar et al.

(10) Patent No.: US 7,225,197 B2
(45) Date of Patent: May 29, 2007

(54) DATA ENTRY, CROSS REFERENCE DATABASE AND SEARCH SYSTEMS AND METHODS THEREOF

(75) Inventors: Larry E. Lissar, Los Gatos, CA (US); Greg Carson, Anchorage, AK (US); Kendall Graven, Salem, OR (US); Michael Graven, Carmel, IN (US)

(73) Assignee: ElecDeCom, Inc., Los Gatos, CA (US)

( * ) Notice: Subject to any disclaimer, the term of this patent is extended or adjusted under 35 U.S.C. 154(b) by 396 days.

(21) Appl. No.: 10/284,240

(22) Filed: Oct. 31, 2002

(65) Prior Publication Data
US 2004/0088283 A1     May 6, 2004

(51) Int. Cl.
*G06F 7/00*     (2006.01)
(52) U.S. Cl. .................................. 707/102; 707/3
(58) Field of Classification Search ............... 707/3, 707/4, 5, 6, 100, 102; 706/47, 48; 700/49
See application file for complete search history.

(56) References Cited

U.S. PATENT DOCUMENTS

| 6,341,281 B1 | 1/2002 | MacNichol et al. |
| 6,341,288 B1 | 1/2002 | Yach et al. |
| 2002/0107845 A1 * | 8/2002 | Takahashi ................. 707/3 |
| 2002/0111932 A1 * | 8/2002 | Roberge et al. ............ 707/1 |
| 2004/0103088 A1 * | 5/2004 | Cragun et al. ............. 707/3 |

FOREIGN PATENT DOCUMENTS

| EP | 1128289 A2 * | 8/2001 |
| WO | WO 01/39031 A3 * | 5/2001 |

* cited by examiner

Primary Examiner—Jeffrey Gaffin
Assistant Examiner—Kavita Padmanabhan
(74) Attorney, Agent, or Firm—Staas & Halsey LLP

(57) ABSTRACT

A method and system unifying existing data of a target industry from existing sources of the data by designing a data model by applying varying data integrity methods to define characteristics, features and/or functions of items in the target industry as data elements, electronically reading, parsing and transforming data from existing electronic data sources of the target industry to input to the data model, designing user interfaces to the data model, the user interfaces corresponding to user segments of the target industry, and dynamically maintaining normalization of the data model according to the varying data integrity methods during any type of access to the data model by the user segments. A data entry access to the data model comprises dynamically constructing search indexes, each search index defined as a unique data field and a text searchable concatenation of other fields' data in any given data table of the data model.

16 Claims, 17 Drawing Sheets

| Part Name | Description | Manufacturer |
|---|---|---|
| | | |
| | | |
| | | |

↗ 552

↗ 550

| Voltage | Current | Heat Production | Resistance | Capacitance |
|---|---|---|---|---|
| | | | | |
| | | | | |
| | | | | |

↗ 555

| X-Dimension | Y-Dimension | Z-Dimension | Pin Configuration | Material | Color |
|---|---|---|---|---|---|
| | | | | | |
| | | | | | |
| | | | | | |

Demo - Search for Products  1400

Search by: Product Name  
For this string: Resistor

| FIND |

Click any one of the following to reach the product information page.

There are 8 products that contain "resistor":

| Product Name | Manufacturer | Department |
|---|---|---|
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |
| Thick Film Ceramic Substrate Resistor Material | Example, Inc. | Resistors |

FIGURE 14

DATA ENTRY, CROSS REFERENCE DATABASE AND SEARCH SYSTEMS AND METHODS THEREOF

BACKGROUND OF THE INVENTION

1. Field of the Invention

The present invention relates to artificial intelligence (expert) data model (mapping) systems and methods. In particular, the present invention provides an expert data model system to design a data model (modeling a database structure) for a subject with very large number of elements (fields) that describe the subject, to intelligently validate existing data (data related to the subject), to intelligently enter the existing data into the database, to intelligently search the database and provide any information based on the entered data, and to substantially increase data integrity as well as simplify database search, database search speed, efficiency, and effectiveness.

2. Description of the Related Art

Typically existing data of a target industry is electronically stored for information retrieval by creating a database and entering, via an automated process and/or manually, the existing data into the database. However, subjects, such as a compendium of prescription drugs, books, DVD's, Internet addressing data, and electronic parts and components, can have potentially very large number of data elements (fields/domains), which typically increase risk of substantial reduction in data integrity level, such as validity, consistency and accuracy of the data in the database. A reduced level of data integrity reduces accuracy level of information retrieval from the database (i.e., frustrates searching), which increases undetectable error risks as well as adversely affecting users' strategic decision making based upon inaccurate and/or incomplete information (i.e., affecting an organization's established/defined purpose and uses of the data).

For example, data models of typical databases are relational and flat data sets with limited number of data elements, limited number of primary keys, and ill-defined data element constraints. Such relational and flat data sets typically provide substantially reduced search speed when a subject has very large number of data elements. Significantly, because of lack of and/or ill-defined domain constraints, automated and/or manual entry of existing data typically provides a low level of data consistency, providing inefficient data storage, and substantially degrading search speed and search result accuracy. In particular, inconsistencies may exist within data and/or inconsistencies are likely introduced during entering of the data. Further, limited number of primary keys substantially frustrates effective information retrieval, providing overly and unnecessarily inefficient, complicated and extremely time consuming data search. Even combinations of database keys alone do little to increase the effectiveness and the efficiency of the data storage and/or search retrieval results.

In case of electronic components target industry, buyers/planners, engineers, quality assurance personnel, and component manufacturer sales and marketing individuals, each typically have significant problems in the identification, location, and procurement of electronic components using existing data sources of manufacturer, sales representative, distributor web sites, print and/or electronic catalogs.

The following illustrates the typical problems of each member of the procurement chain. For engineers, identifying parts takes too much time, catalogs are obsolete, general search engines on the web do not work well, meeting with salespeople may not be productive in identifying parts, receiving samples is time consuming, arrival of samples is not practical to predict and delay in parts delays a product.

For buyers/planners, tracking down parts can be unnecessarily time consuming, there is no time to verify that the components purchased are the best or most cost effective and communicating with engineers takes too much time. For quality assurance, there is too many products to verify compliance with specifications and communication with engineers takes too much time.

For the manufacturer, personnel costs (e.g., manufacturer representative and distributor commissions) unnecessarily increase because of such inefficiencies to accommodate the engineers and the buyers/planners, and the manufacturer does not know the buyers directly.

Therefore, there is a need to provide a unified data source for data of a target industry to interface various user types of the data in the target industry.

SUMMARY OF THE INVENTION

The present invention provides an expert data model system to design a data model (modeling a database structure) for a subject with a very large number of data elements (fields/domains) that describe the subject, to intelligently validate existing data (data related to the subject), to intelligently enter the existing data into the database, to intelligently search the database and provide any information based on the entered data, and to substantially increase data integrity, including database search speed, efficiency, and effectiveness. For example, an expert data model system according to the present invention can provide information relating to any set of items (any subject/item category) with very large number of elements, such as (without limitation) electronic parts and components, prescription drugs, patient data, population data, user profile data, Internet addressing data, books, DVD's. This is done by intelligently designing an intelligent data model based upon characteristics, features, and/or functions of a subject for which a database system is being implemented, intelligently validating and entering existing and/or new data into the database, and intelligently and rapidly (substantially instantly) searching the database to provide any information relating to the subject.

An aspect of the present invention provides intelligently designing data models by applying varying database normalization methods to subjects represented in the data models. In particular, the present invention provides a normalization phase applying varying/different normalization methods to describe characteristics, features and/or functions of any given subject (category of items) represented in a data model and to efficiently maximize data integrity (to highest data integrity level) of the data model. Further, the present invention provides a continuous normalization phase, thereby allowing an automatic dynamic/real-time intelligent normalization.

Another aspect of the present invention provides reading, during data entry of fields in a record (for example, a new record), data of other fields and/or records in a database to automatically provide suggestions for inputting data into (i.e., filling or completing) other fields of the record being entered or automatically filling the other fields of the record being entered. In particular, the present invention provides while entering data into a field of a record, to search the database for fields similar to or associated with the entered field to fill with data other fields of the record being entered, allowing automatic real-time intelligent data entry.

Another aspect of the present invention provides reading, during data search (information retrieval), data of other fields and/or records in a database to automatically provide the data of the other fields and/or records. In particular, the present invention provides while entering search terms, to search the database for fields similar to or associated with entered search terms to provide data of the similar or associated fields, allowing automatic real-time intelligent information retrieval.

Another aspect of the present invention provides intelligent search keys as follows. Intelligent search keys can be defined as either a combination of other key fields or separate key fields, that are customized for the subject of the database system being implemented, such as strength, size, frequency, and duration key fields for a prescription drugs subject, or physical and/or electrical characteristic key fields for an electronic components subject.

Another aspect of the present invention provides dedicating each process of the invention to a processor, speeding data processing.

Another aspect of the invention provides unifying existing data of a target industry from existing sources of the data, comprising designing a data model by applying varying data integrity methods to define characteristics, features and/or functions of items in the target industry as data elements, electronically reading, parsing and transforming data from existing electronic data sources of the target industry to input to the data model, designing user interfaces to the data model, the user interfaces corresponding to user segments of the target industry, and dynamically maintaining normalization of the data model according to the varying data integrity methods during any type of access to the data model by the user segments, thereby electronically interfacing different user segments of the target industry. Further, a data entry access to the data model comprises dynamically constructing search indexes, each search index defined as a unique data field and a text searchable concatenation of other fields' data in any given data table of the data model.

Advantages of the invention will be set forth in part in the description which follows and, in part, will be obvious from the description, or may be learned by practice of the invention.

BRIEF DESCRIPTION OF THE DRAWINGS

The advantages of the invention will become apparent and more readily appreciated from the following description of preferred embodiments, taken in conjunction with the accompanying drawings of which:

FIG. 5 illustrates table diagrams for electronic parts according to an embodiment of the invention.

FIG. 14 is a display screen of search results by product name according to an embodiment of the present invention.

DETAILED DESCRIPTION OF THE PREFERRED EMBODIMENTS

Figure 1:
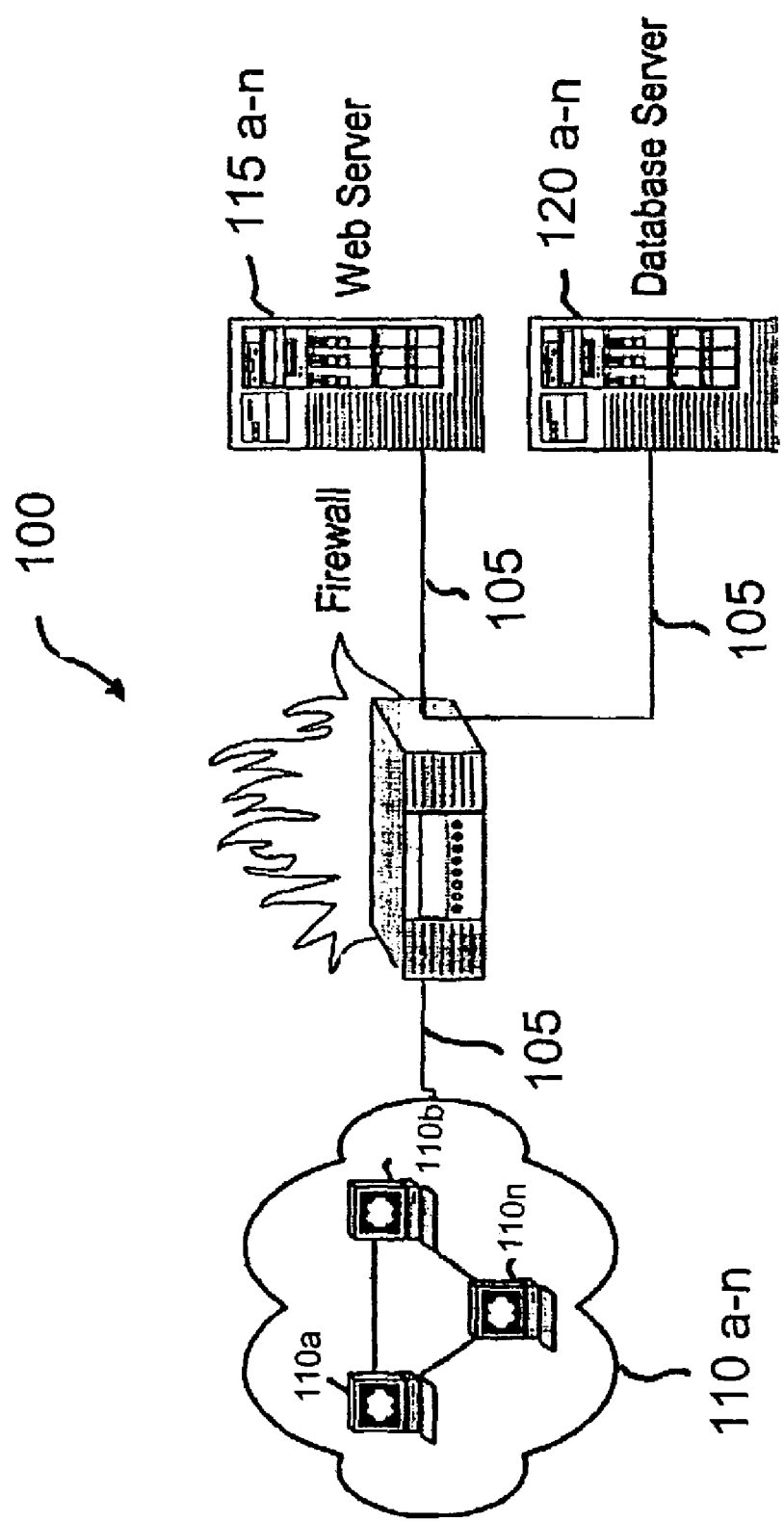
FIG. 1 is a block diagram of a system according to an embodiment of the present invention.

Reference will now be made in detail to example preferred embodiments of the present invention, which are illustrated in the accompanying drawings, wherein like reference numerals refer to the like elements throughout. The embodiments are described below to explain the present invention by referring to the figures.

FIG. 1 is block diagram of a system according to an embodiment of the present invention. In FIG. 1, system 100 components can communicate via network(s) 105, which can be wire or wireless, having conventional (any suitable means well known in the art) topologies and conventional architectures. The architecture of networked system 100 can be, for example, a client-server using conventional communication protocols. The network(s) 105 can be, for example, a local area network or a wide area network, such as the Internet, or a combination using conventional communication protocols. Processes of the present invention are implemented in software, using, for example, any commercially available Relational Database Management Systems (RDBMS) and Internet based technology, such as web browser technology. Systems 110*a-n*, 115*a-n* and 120*a-n* are computers that execute the processes of the present invention. The computers 110, 115 and/or 120 embodying the processes of the present invention can be conventional computers, such as (without limitation) single and multi-processor computers/mini-computers/mainframes, and/or computing devices, such as personal digital assistants (PDAs), capable of storing, displaying and processing information, and communicating with other computers and computing devices by receiving and transmitting information via the network(s) 105 using conventional techniques.

In FIG. 1, the example embodiment is a networked client-server system 100 in which client system(s) 110 communicate with web server(s) 115*a-n* and database servers 120*a-n* via network(s) 105 using conventional Internet communication protocols and Internet document management techniques for data communication and user interface, such as Hyper Text Transfer Protocol Secure (HTTPS), Hyper Text Markup Language (HTML), and Extensible Markup Language (XML).

In FIG. 1, the web servers 115 can execute business logic (application) processing layers and/or presentation processing layers of the present invention, which provide an interface with users at client systems 110. The database servers 120 can execute data resource processing layers of the present invention. More particularly, the application layers on web servers 115 are in communication with the data resource layers implemented in database servers 120, using conventional techniques. Although, the example embodiment illustrates web servers 115 separate from database servers 120, the present invention is not limited to such configuration and other configuration may be provided. For example, the web and database servers 115 and 120 can be implements together on one computer using conventional techniques.

Figure 2:
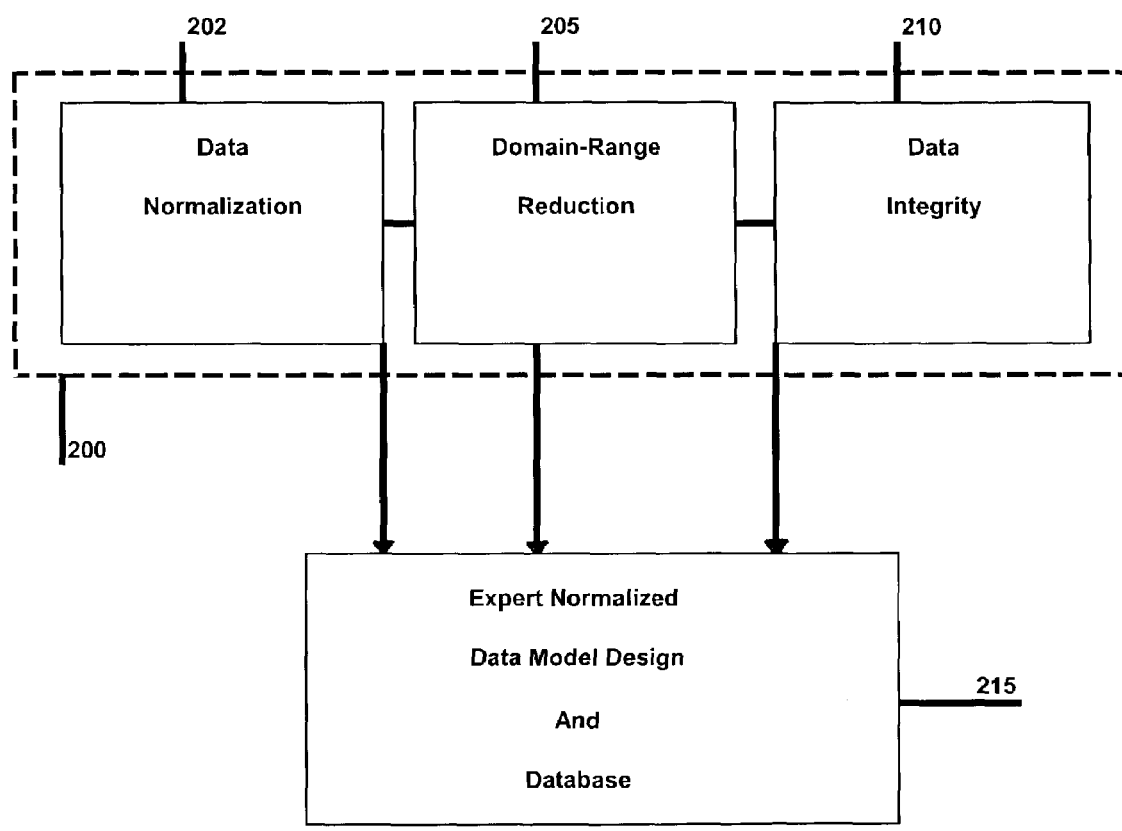
FIG. 2 is a flow chart to design a data model according to an embodiment of the present invention.

FIG. 2 is a flow chart to design a data model according to an embodiment of the present invention. The present invention relates to highly normalized database designs and expert normalization (dynamic normalization). "Normalization" refers to database design methods reducing redundancy, which increase data integrity, in linked and indexed database structures. The present invention provides a method of designing a data model by performing normalization 200 that applies varying automatic/dynamic/real-time redundancy reduction methods of 202, 205 and 210 to define and/or populate characteristics, features and/or functions of a category of items as data elements, thereby providing an expert (intelligent) normalization. The characteristics, features and/or functions of items in a target industry would also encompass information on entities using and/or providing data related to the items, such as manufacturers, end-users, etc.

In FIG. 2, normalization 200 comprises processes of data normalization 202, domain range/constraint reduction measures 205 and/or validation measures 210. The varying/different redundancy reduction methods of 202, 205 and 210 describe characteristics, features and/or functions of any given category of items (a subject/things/articles) represented or indicated in a data model, thereby maximizing data integrity (highest data integrity level) of the data model. Further, the normalization phase 200 is continuous by being dynamic, thereby providing an intelligent (expert) data model.

In FIG. 2, at operation 202, to normalize data of a subject, characteristics, features and/or functions of the subject are described across many sources of data for the subject. For example, a substantially exhaustive list of allowed domains that may hold input data of the subject is determined. Further, the subject is described as a collection of domains at a higher level of abstraction than each subject source based upon characteristics, features and/or functions of the subject. Further, domains can be described to provide a cross-product lineage.

Using electronic parts/components as an example, typically initial domains used to characterize a particular electronic part come from manufacturers of the parts. At operation 202, domain rule sets are used to convert initial data being input in a core database into input forms (i.e., collection of domains) reflecting the domain rule sets. The domain rule sets 202 correspond to the substantially exhaustive domains and higher level domains describing the characteristics, features and/or functions of the subject. For example, in the case of the electronic parts/component, possible domains can include all the physical features involving how electricity flows through a specified electronic part (current, voltage, resistance, capacitance, etc.) as well as any manufacturer-specific characteristics (materials, plating, color, markings, size/shape dimensions, etc). This approach is unique in having organized characteristics, features and/or functions in a fashion that exhaustively might be needed for identifying and selecting a particular electronic part, while efficiently reducing the domains, or number of allowed levels, for each characteristic, feature and/or function describing an electronic part, so that "same" or "different" are meaningful to all possible end users of the electronic parts, such as engineers, testers, etc., that will use the data model (database system).

Therefore, in the present invention the domains of a given item category (domain rule sets 202) represent a set of descriptors for the item category from many subject sources, thereby providing a product/subject class structure. For example, in case of electronic parts, a manufacturer of resistors may have "20 ohms" as a field, which at operation 202 can be converted to two domains of resistor value and resistor unit (i.e., "20" for "rvalue" and "ohms" for "runits"), thereby providing a domain rule. Conventional knowledge extraction/heuristic methods can be used to retrieve and/or collect information requirements to define the domain rule sets 202.

Because the data model based upon the data normalization 202 is designed based upon the higher level domains describing the characteristics, features and/or functions of the subject from many subject sources, the data model can store data using repeated/shared fields (i.e., characteristic-feature-function-specific fields), which also provides a higher normalized data model than a typical data model designed according to normalizations that only seek to reduce number of times a field is used and/or reduce/eliminate field dependencies. For example, regarding electronic parts item category, a capacitor and a resister can share one defined field to describe how electricity flows through a capacitor and a resistor (i.e., capacitor and resistor can have overlapping domains), thereby providing another domain rule.

Intelligent searches are performed when using such overlapping domains. Using the capacitor and the resistor example, the capacitor domains typically include capacitance (farads), resistance (ohms), current (amps), potential difference (voltage), whereas the resistor includes all of these as well. For the capacitor, capacitance is most important electronic attribute, in addition to type of capacitor (prong vs. tape, barrel vs. upright, etc). For the resistor, resistance is most important, in addition to type of resistor. However, for example, a design engineer as an end-user typically knows other capacitor and resistor characteristics (voltage tolerances, current tolerances, etc.) as well. Thus, a search under capacitors and type of capacitor includes capacitance as primary and the other domains as secondary. For resistors and specific types of resistors, the resistance is primary and other domains secondary. Therefore, for capacitors, search by resistance is secondary and for resistors, search by capacitance is secondary. For both capacitors and resistors, the current and potential difference domains are secondary.

Further, the rule sets 200 can be dynamic (dynamic rule sets) because the domains are at a higher level of abstraction than each subject source. Because the rule sets 202 have the higher-level domains, the rule sets 202 can dynamically accommodate domain readjustments from the subject sources via only adjusting current data. For example, the current data corresponding to a domain of a subject source can be changed when external sources make it necessary to change the data where "same" is not correct according to manufacturers, design engineers, part testing sources (for example, Underwriters Laboratories), etc. The ability to accommodate change is critical as characteristics, features and/or functions for a population of electronic parts can constantly change as engineers discover where particular parts can and cannot be used, are tested for tolerances, as tolerances change with different batches, and manufacturing processes are changed, suspended or discontinued.

Although known redundancy normalizations reduce redundant fields (i.e., thereby reducing redundant data) in a data model, such normalizations are applied to a data model to be populated from a single subject source. In other words, typical databases normalizations are in view of a single enterprise or company. Advantageously, the data normalization 202 allows designing and dynamically maintaining a highly normalized data model (expert data model) to be populated and searched from two or more same-subject sources, thereby providing a multi-enterprise normalized database. More particularly, the data normalization 202 allows building a product cross reference system, for example, a dynamic competitor product cross reference system (a product class structure), by allowing parameterized (parametric) data searches across various types and/or different subject sources (i.e., different data sources, such as different manufacturers, different databases, etc., and various types of data sources, such as end-users, third party suppliers, testers, etc.) because initial data of the subject from any subject source is converted into the input forms describing the subject as a collection of domains (dynamic rule sets) at a higher level of abstraction than each subject source.

Therefore, in FIG. 2, at operation 202 a highest degree of data normalization is applied to develop/create/generate fields (domains) describing characteristics, features and/or functions of a subject (category of items) from many subject sources being modeled, such as electronic parts and components, books or medical prescription drugs, etc.

In FIG. 2, at operation 205 subject-specific domain-constraint reduction occurs in several data entry phases, further normalizing the data 202, which increases data storage efficiency as well as data integrity far beyond the typical database normalizations. More particularly, from machine-readable subject sources (electronic lists, websites, etc.), there is the initial processing at operation 202 to convert the data to the initial input forms that include all the variables needed to describe the subject, such as a particular class of electronic parts. For example, in case of the electronic parts this includes conversion to standard units (picofarad to farads, etc), separating values from unit types ("20 ohm" becomes value "20" and value unit "ohm," as described above), and correct identification of a part type (tape resistor, for example). For manual keyboard data entry, input from correct electronic-part type input forms would be required. For optical character recognition input (OCR), there is an initial stage of checking quality and nature of data conversion from the digital image prior to evaluation as machine-readable data.

At operation 205, after the initial data input structure (input form) has been created, the domain range of all the input form domains (fields) are compared to domain ranges for like domains (fields) in the core extant databases created at operation 202. This is the basis for conversion of "similar" that should be "same" domain constraint. For example "Street", "STREET", "Str,", etc in address blocks would all be changed to a single "Street." Variability in input forms, including keypunch error, is constrained to acceptable domain levels with operation 205. At operation 205, new acceptable domain levels can be added after review and confirmation.

At 205, domain-constraint reduction that is dynamic involves incorporation of input from systematic statistical quality control (SSQC), from manufacturers, and from user-engineers. When recommendations for adjustment/correction are received, the proposed changes are reviewed. If accepted, they are incorporated into the variables for the relevant parts and components and the normalization of fields adjusted. When data is input to the databases from electronic subject sources (e.g., machine-readable data sources, such as electronic lists, websites, etc), because typically data entry into the electronic data sources involves error, as do conversions from one data format to another or transmission from one location to another, dynamic data adjustment becomes important to preserve/maintain data integrity throughout a database life cycle from creation. Accordingly, the database is designed to incorporate these types of adjustments dynamically by imposing domain-constraint reduction during data entry from the electronic sources according to the domain rule sets 202.

Further, dynamic data adjustment allows database-manager-initiated, manufacturer-initiated, and end user-initiated correction of incorrect data. Typically, database managers are database developers and/or service providers, such as ElecDECom, Inc., Los Gatos, Calif., the assignee of the present application. Database-manager-initiated efforts include SSQC ongoing measures (sample-based statistical validation performed on a scheduled basis) as well as discrepancy-based measures (e.g., different original sources disagree on what is correct, rule-based disagreement where field values are of incorrect form, etc). Of course, manufacturers and database end users, such as engineers in case of electronic parts/components, also can submit recommendations for corrections or adjustments. Because, typically an original manufacturer of a part or standard laboratory testing sources for tolerances or limits, can be an "original source" for a "correct" value, confirmation from the original source may be desirable to incorporate manufacturer or end-user based adjustments into the databases.

In FIG. 2, further at 210, validation measures are applied during data entry and/or data search. Therefore, validation measures 210 provide continuous domain-constraint normalization, during data entry and/or search, based upon the intelligent domains and domain constraints provided via the data normalization 202 and the domain range/constraint reduction measures 205. Continuous data integrity is provided by cross checking, during data entry, similar data fields in the database to determine if to be entered data is within a definable and/or normally acceptable range. The validation measures at 210 achieve continuing (automatic and/or manual) data integrity (e.g., data accuracy and efficiency) of the domains for any given item category. Validation 210 advantageously ensures more accurate data entry and more accurate search results, also simplifying data entry and search.

Validation rules 210 for any given set of descriptors (domains/fields) can be formed for any given item category by reading and comparing similar descriptors in the database. For example, when applying the validation measures 210 of the present invention to a prescription drugs item category, during data entry, validation rules can be created/generated interactively with a user and/or automatically for dosage domains by comparing previously entered dosage information for a family of drugs related/similar to a drug for which dosage information is being input. For the electronic parts example, validation rules can be created/generated by comparing various physical elements and electronic characteristics that describe a common part, such as a resistor, to develop field ranges.

Therefore, validation rules based on data models for any given item category can be developed from the set of descriptors that describe the item category by comparing data of previously entered fields of the item category to data being entered and/or used as search terms and using results of the comparison to develop limits of acceptable ranges for the descriptors during data entry and/or data search. Typically, similar data (i.e., close to the same) can also be used to dynamically adjust the descriptor ranges, thereby providing the dynamic domain-range reduction 205. For example, when one descriptor uses 400 MHz speed and another uses 390 MHz for speed, the range can be expanded to include 390 MHz and 400 MHz. Further, during data entry, the invention could prevent, as unacceptable, entry of 12 feet (144 inches) by 8 feet (96 inches) book dimensions when books normally printed by a publisher of the book are 12 inches by 8 inches.

Therefore, the data validation measures 210, can continuously validate the domain constraints during data entry and/or search to maintain the normalization of the data model as well as dynamically adjust the domain ranges, thereby providing intelligent (expert) domains.

In FIG. 2, the normalization phase 200 provides a highly normalized and intelligent data model 215, dynamically maximizing data integrity throughout life cycle of a database based upon characteristics, features and/or functions of a category of items (subject) modeled. Therefore, at 215 a unique data model (database structure) is created for each item being modeled. Advantageously, the data model 215 can describe, with a high data integrity level, very large datasets having very large number of data elements (fields/domains) from many data sources. Example datasets can be (without limitation) electronic parts and components, prescription drugs, patient data, population data, user profile data, Internet addressing data, books, DVD's. Therefore, the present invention provides a normalization method to maximize data integrity comprising at least two or more of subject-specific parameterized domain specification, dynamic domain constraint/range reduction, and/or dynamic data integrity.

Figure 3A:
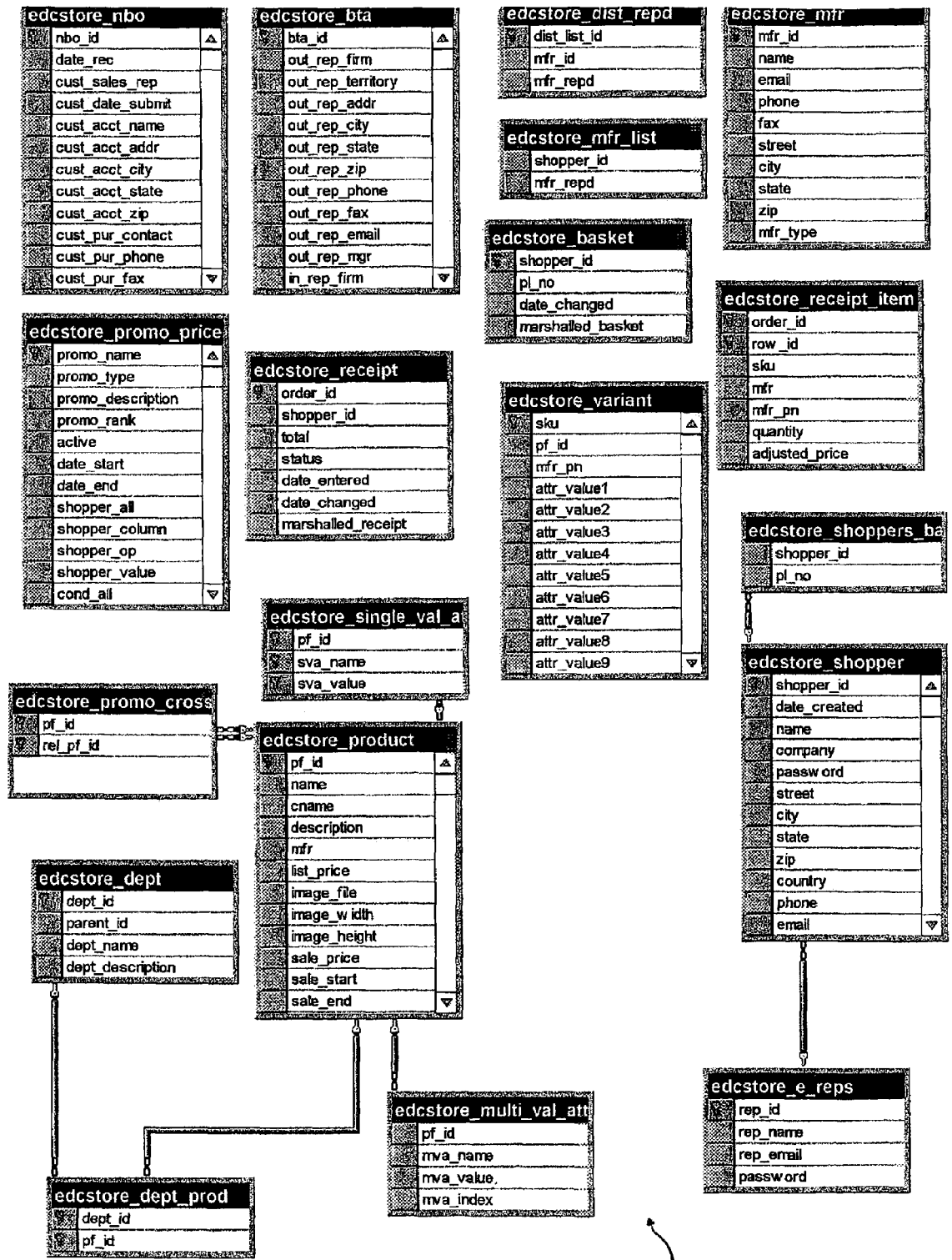
FIG. 3A illustrates table diagrams of a data model according to an embodiment the present invention.
Figure 3B:
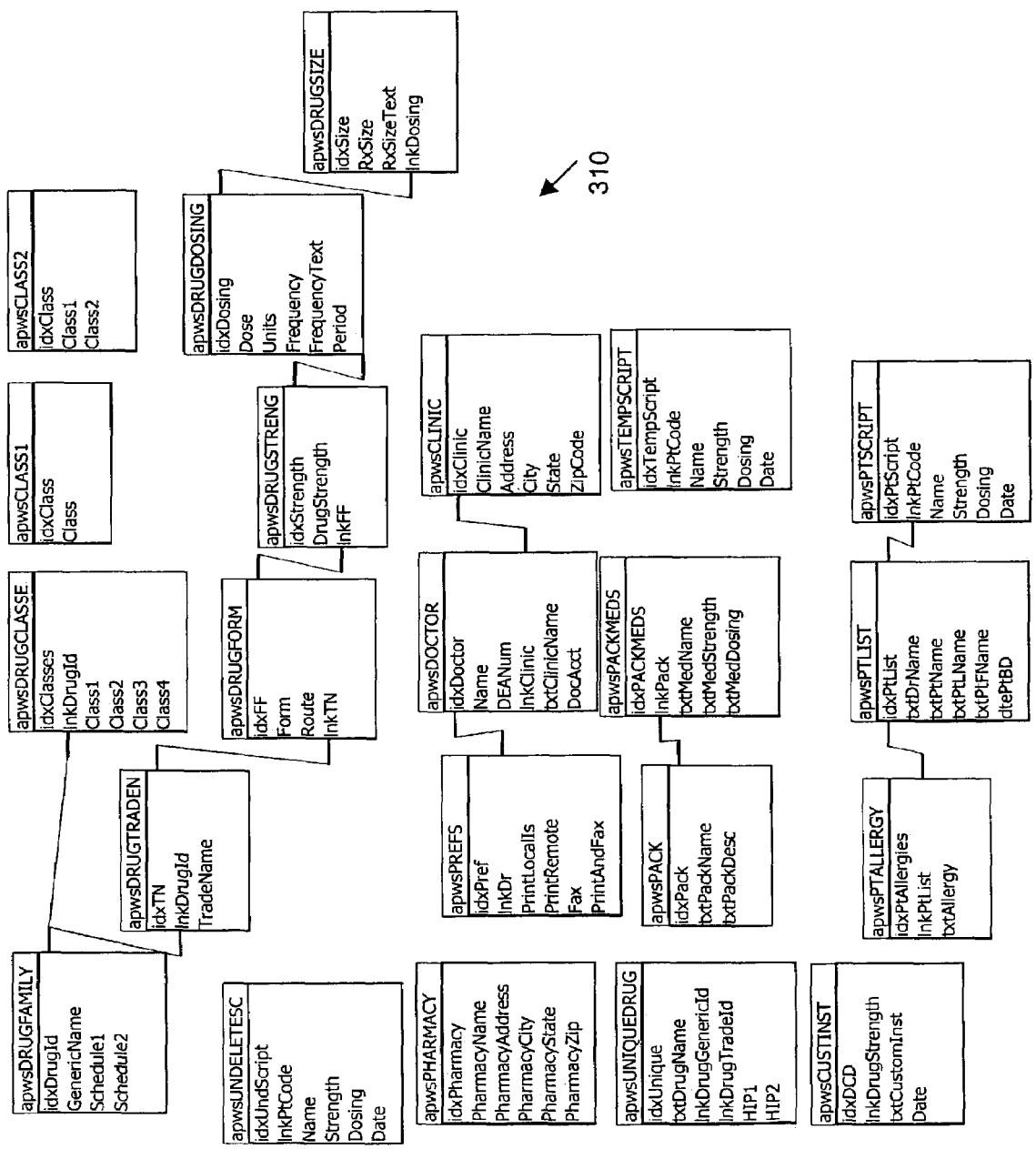
FIG. 3B illustrates table diagrams of another data model according to an embodiment of the present invention.

FIGS. 3A and 3B illustrate table diagrams of data models according to embodiments of the present invention. The data model 300 normalized according to the normalization 200 describes the electronic parts dataset from many data sources of electronic parts, such as electronic lists, website, etc. The data model 310 normalized according to the normalization 200 describes drug prescription information from many data sources of drug prescriptions, such as pharmacies, doctor offices/clinics/hospitals, drug manufacturers, etc.

Figure 4:
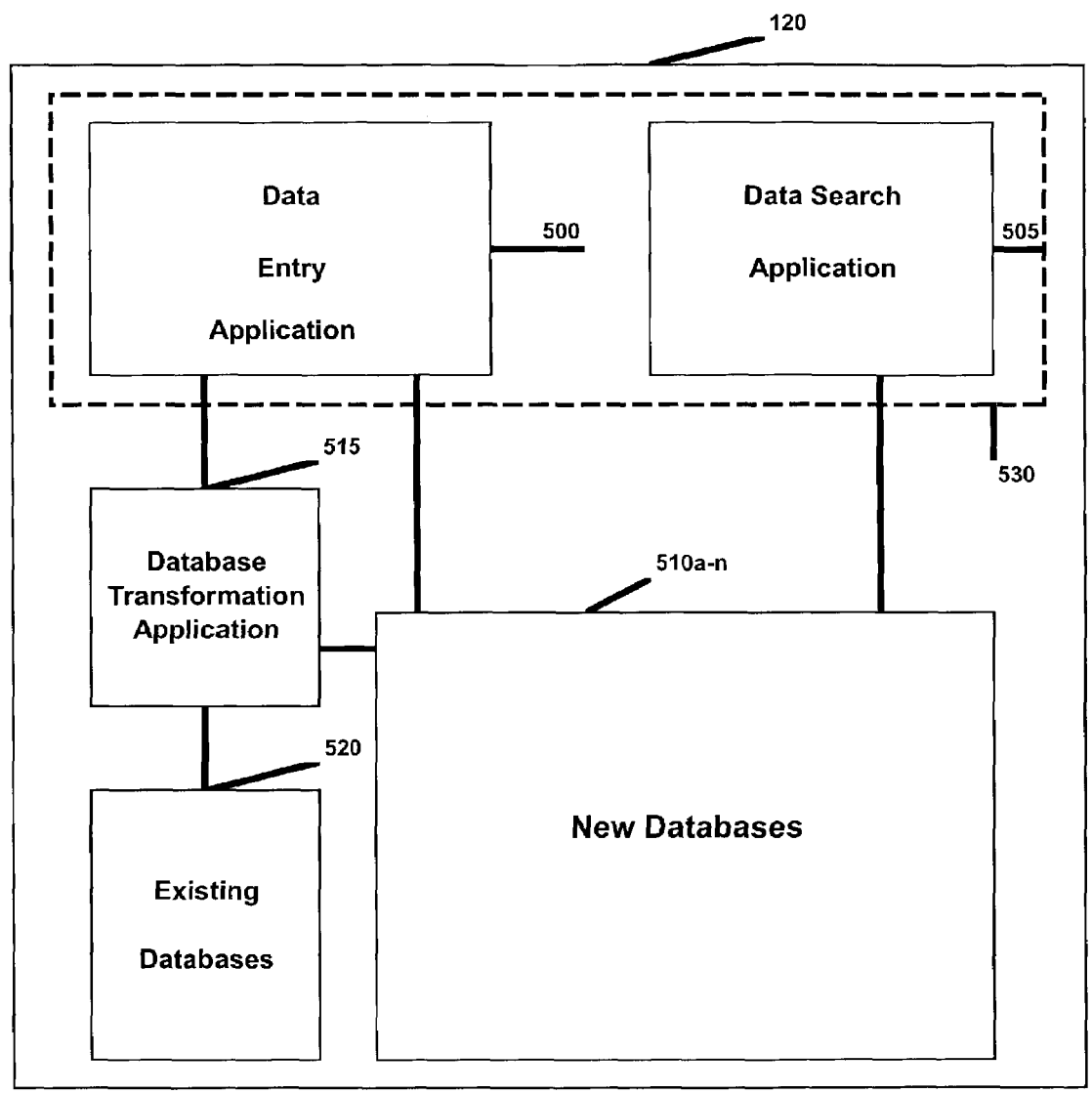
FIG. 4 is a functional block diagram of software processes according to an embodiment of the present invention.

FIG. 4 is a block diagram of software processes (applications) according to an embodiment of the present invention. In particular, the software processes of the present invention can execute on web servers 115 and/or database servers 120 using any commercially available RDBMS, providing an interface and information with/to users at client computers 110 via network(s) 105. The users at client computers 110 can, online, for example, via the Internet, retrieve and/or interact with information from a database system 215 designed and implemented according to the normalization 200 for a category of items.

In FIG. 4, a database server 120 comprises a data entry process 500 and a data search process 505, which access databases 510a-n. Databases 510a-n are data models 215 representing subjects modeled according to the normalization 200, such as the example data models in FIGS. 3A and 3B. More particularly, the data normalization 202 is further normalized and dynamically maintained by the domain-range reduction 205 and validation measure 210 processes based upon data entry functions (applications) 500 of the databases 510, thereby providing a dynamically highly normalized multi-source database system (expert data base system) allowing representation of a subject from many same-subject sources.

In FIG. 4, the data entry process 500 comprises various expert ("specially trained") programs dynamically performing the normalization 200 as follows. The data entry process 500 pre-compares, during data entry of fields in a record, for example, by a user and/or a process, data of other fields and/or records in database 510 to automatically provide data input suggestions (i.e., filling or completing) for fields of the record being entered or automatically filling the fields of the record being entered. In particular, the data entry process 500, while entering data into a field of a record of the database 510, performs a pre-comparing process by searching the database 510 for fields similar to or associated with the entered field. Based upon the pre-comparing process, the data entry process 500 can either fill other fields of the current/active record being entered with the similar data and/or offer the similar data as a starting point to fill the other fields of the current/active record being entered.

FIG. 5 illustrates table diagrams for electronic parts according to an embodiment of the invention. Using the electronic parts subject example, when entering electronic parts into a database to be used for an online parts locator search engine 505, parts records can be pre-entered from several companies in the database 510 or some records have already been entered. The parts being entered can have many fields (data elements) that describe each part. For example, voltage, current, heat production, x-dimension, y-dimension, z-dimension, pin configuration, material, color, resistance, capacitance, name, description, and manufacturer. One data table (relation) 550 can be defined containing the name, description, and manufacturer fields, and a search index is created based upon this table. According to an aspect of the invention, a description field 552 storing information related to characteristics, features and/or functions of a subject (e.g., electronic parts), significantly reduces data entry and search times (described in more detail below). A second data table (relation) 555 can be defined containing the voltage, current, heat production, resistance, and capacitance fields, and a search index is created based upon this table. A third table (relation) 560 can be defined containing the remaining fields, and a search index is created based upon this table. As the user enters data in the part name and description fields for the table 550, the data entry program 500 searches the existing records for other parts that have same or similar data in their part name and description fields. If the program 500 finds same or similar records, the program enters the found data into data entry screens for the current part data entry for the remaining as yet un-entered fields in the tables 550, 555 and/or 560.

Figure 6:
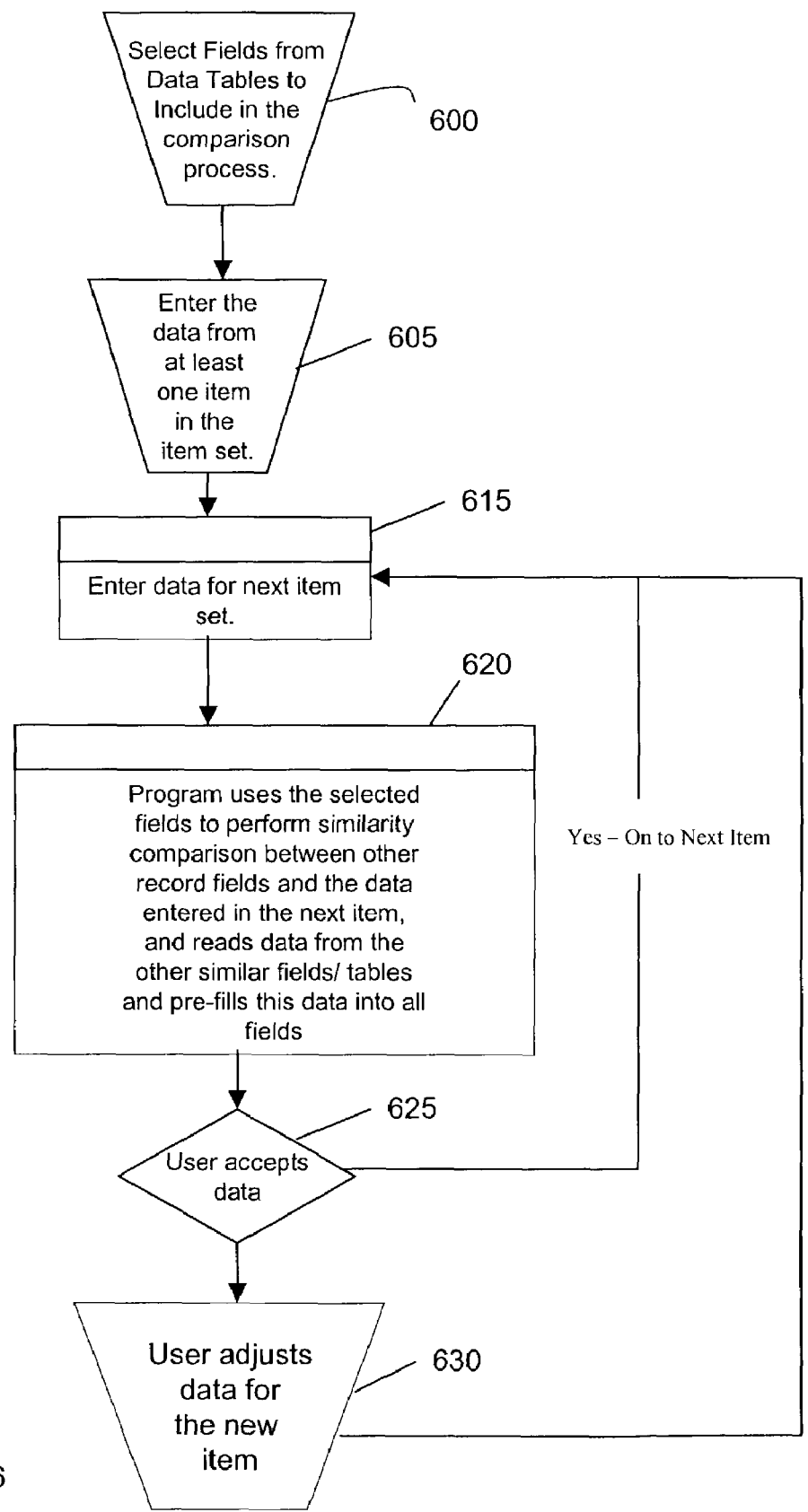
FIG. 6 is a flow chart of a pre-comparing process for the relations shown in FIG. 5 according to an embodiment of the present invention.

FIG. 6 is a flow chart of a pre-comparing process based upon the relations shown in FIG. 5, according to an embodiment of the present invention. At operation 600 fields from data tables describing a subject are selected to include in a comparison process. Typically, at 600 all fields in all the data tables for the subject are selected. For example, at operation 600 all of the fields of the tables 550, 555 and 560 are selected. At operation 605, data for at least one record of an item in the subject (e.g., data for a resistor) is entered into the applicable tables. At operation 615, when data of another item is entered, at operation 620 the entered fields are compared to other record fields selected at 600 to locate same or similar fields and data from the other same or similar fields are pre-filled into all fields of the active record being entered.

In FIG. 6, for example, at operation 615, a primary description field in a next record of the item in the subject (e.g., another resister) is entered and at operation 620 the primary description field is compared to other record fields to locate same or similar fields and data of the other fields are pre-filled into all fields of the active record being entered. Typically, fields entered at operation 615 are not refilled/re-entered, unless for domain-range adjustment. Same or similar can be based upon any predetermined criteria, for example, close to the same, an association, etc. For example, a processing unit item may use 400 MHz speed and another processing unit uses 390 MHz for speed. Therefore, when "400 MHz processing units" is entered in the primary description field, data from existing record fields of a 390 MHz processing unit can be pre-filled into all other fields of the currently entered 400 MHz processing unit.

In FIG. 6, at operation 625, the user can accept the entered data and continue at operation 615 with data entry of other records. If at operation 625, the user does not accept the entered data, at operation 630, the user can adjust the data and then continue at operation 615 with data entry of other records. At operation 630, the user can be automatically prompted with one or more data adjustment options, the pre-comparing process can automatically adjust the data, and/or the user can manually adjust the data, thereby providing dynamic domain-range reduction 205.

Therefore, on the data input side of this invention there is a computer program (data entry application 500 based upon the rules corresponding to the normalization 200) that could be developed in any computer language or environment that can access a relational database. The program would have data entry screens for as many layers and/or linked data tables that would be required to completely describe the items being entered into the database. The program would start with whatever number of primary, key, or index data fields are required for a summary description of the items to be entered, thereby also allowing intelligent search key on the search side of the invention.

Then the program is developed to 'watch' (read) what data is entered into the primary, key, or index fields. As data is entered into these fields the program looks through the entire database for similar items and pre-fills the other data fields associated with the item being entered and/or offers the data entry person or program several already completed items for each other data field to become part of the record set for the item being entered.

The database itself is simply a series of linked and indexed tables that have key fields defined. The key to the search is to pre-construct a single search repository (data field or record) that already contains multiple key searchable data elements (described in more detail below).

In FIG. 6, advantageously, the pre-comparing process allows intelligent data input, minimizing data input and data input errors. Data input errors are minimized during entry of data into a record by checking the database 510, such as other fields of the record being entered and/or other database records, which have characteristics similar to the record being entered, for previously entered and validated similar fields. Intelligent data entry (as well as intelligent search on the search side) is accomplished by reading data from the previously entered and validated similar fields and comparing the data with data input for the record being entered.

In FIG. 4, the data entry process 500 can further comprise an artificially intelligent data transformation application/tool 515 to read a given data structure and intelligently reformat the data into a new data structure. In particular, for example, the transformation tool 515 can read data from pre-existing databases 520, which store, according to traditional data models, data of subjects to be modeled from any subject sources in a new database 510 of the invention. Advantageously, the transformation tool 515 can intelligently automatically distribute data read from the pre-existing database 520 into fields of the database 510.

In FIG. 4, the transformation tool 515 is a software tool that can read multiple related database tables and reformat data of the tables into a single flat file for analysis and decision support. Advantageously, the analysis and decision support can be performed intelligently automatically based upon a given data model design, such as the normalization 200. The transformation tool 515 can be automatically intelligent as follows. For example, the transformation tool 515 can read a given data structure and automatically reformat the read data according to the normalization 200 into a new data structure, thereby generating a data base 510 representing a subject from two or more subject sources. Further, the transformation tool 515 can be intelligent by posing targeted questions to a data entry user regarding the data structure read in relation to a given data model design 510. Further, the transformation tool 515 can be intelligent by suggesting answers to the questions, so that the data entry user can confirm and/or edit answers to the questions.

Figure 7:
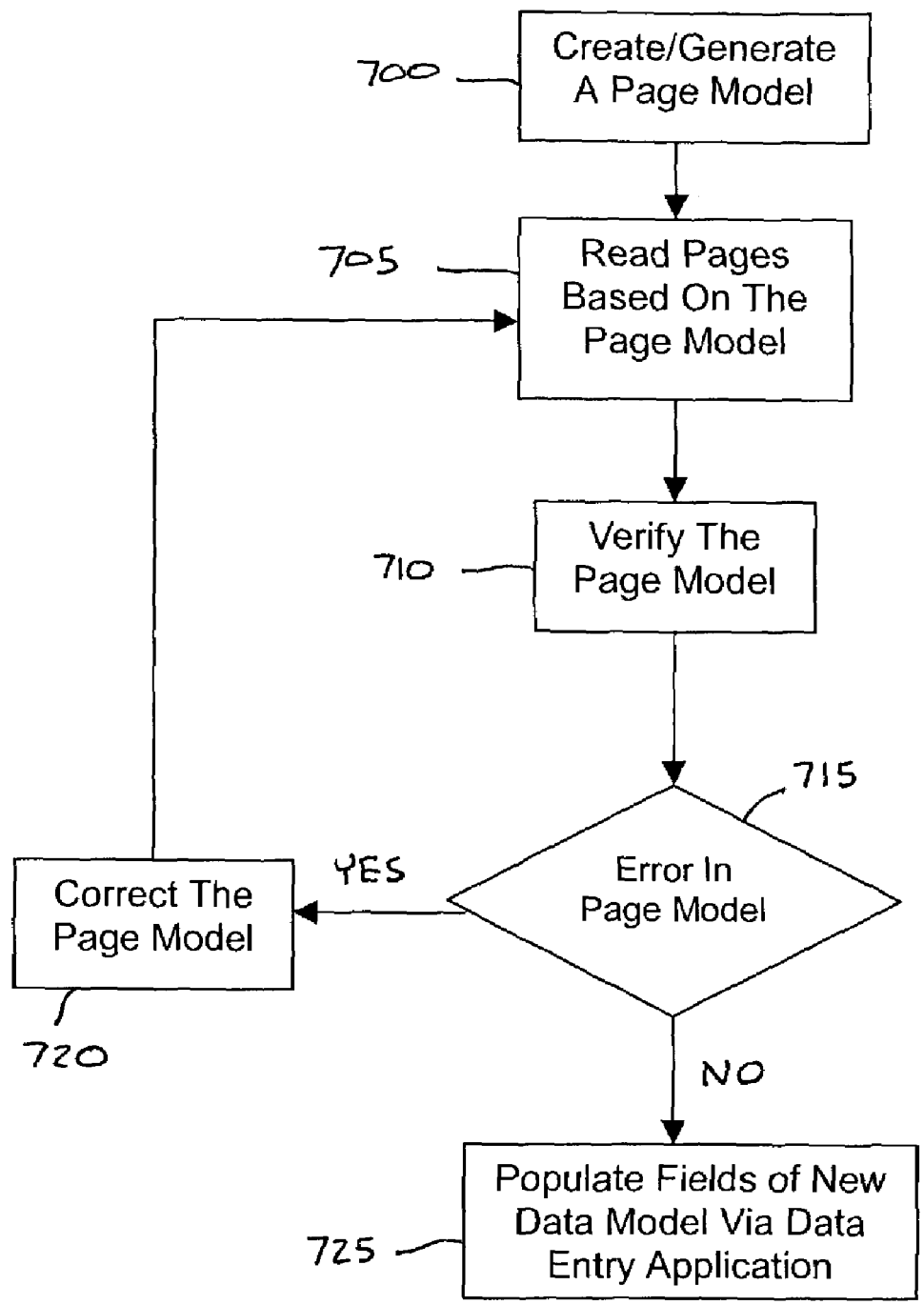
FIG. 7 is a flow chart illustrating operation flow of a database transformation application according to an embodiment of the present invention.

FIG. 7 is a flow chart illustrating operation flow of the database transformation tool 515 according to an embodiment of the present invention. In particular, an example embodiment of the transformation tool 515 can be a parser that parses a given document, such as a web site, a word processing file, or an ADOBE ACROBAT file and extract data components of the document. In FIG. 7, at operation 700, a page model of displayed documents (pages) to be read, such as a web site, is created. The page model describes locations of data on pages to be parsed. At operation 700, the page model can be created manually or generated by an entity relationship diagramming software tool.

In FIG. 7, at operation 705, the parser 515 reads the pages based upon the page model generated at operation 700. The page model is a dynamic model because at operation 710 a data entry user can verify in real-time accuracy of the page model when pages are parsed and if, at operation 715 errors are found, at operation 720 the parser's page model can be corrected. When at operation 715 the page model is correct, at operation 725, the parser 515 via the data entry application 500 places the data read from the pages into record fields of a data model designed according to the normalization 200.

In FIG. 4, the parser 515, which is in communication with the data entry application 500, can speed data entry by providing an alternative automatic data entry from multiple subject sources in addition to the manual data entry of the data entry application 500. The parser 515 data entry approach uses the data model for (thought to) the data entry application 500 as follows. Advantageously, by using the data entry application 500, data read from the pages can be pre-compared according to the pre-comparing process of the data entry application 500, thereby allowing dynamic normalization 200 via dynamic data normalization 202 at operation 700 when page models are generated, dynamic domain-range reduction 205 when at operation 710 the page model is verified, and dynamic validation measures 210 when at operation 710 the page model is verified.

In FIG. 4, the data entry process 500 further comprises a "search index" process as follows. The data entry process 500 dynamically constructs/creates a searchable index from data entered for each table in a dataset. The "search index" in this context provides a "preloaded" search field, as described in more detail below. The "search index" is a combination (concatenation) of essential characteristics, features, and/or functions of data being entered in the database 510. The present invention pre-indexes, meaning that indexing data is assembled for searches before the indexed data is searched. Further, although in typical RDBMS's data exists in just a combination of fields, the "search index" is generated by putting the fields together before the fields are searched. More particularly, as data is initially saved into the database 510 by the data entry process 500 (e.g., parser 515 and/or manual user entry), essential (meaningful to a user searching the data) fields of the data being entered are combined in a pre-defined sequence and full text search capability of an employed database engine (i.e., any commercially available RDBMS) are activated for the "search index." In this manner, as the data is initially entered into the database 510, pivotal search key fields required for substantially rapid search are already present and available (pre-indexing).

Figure 8:
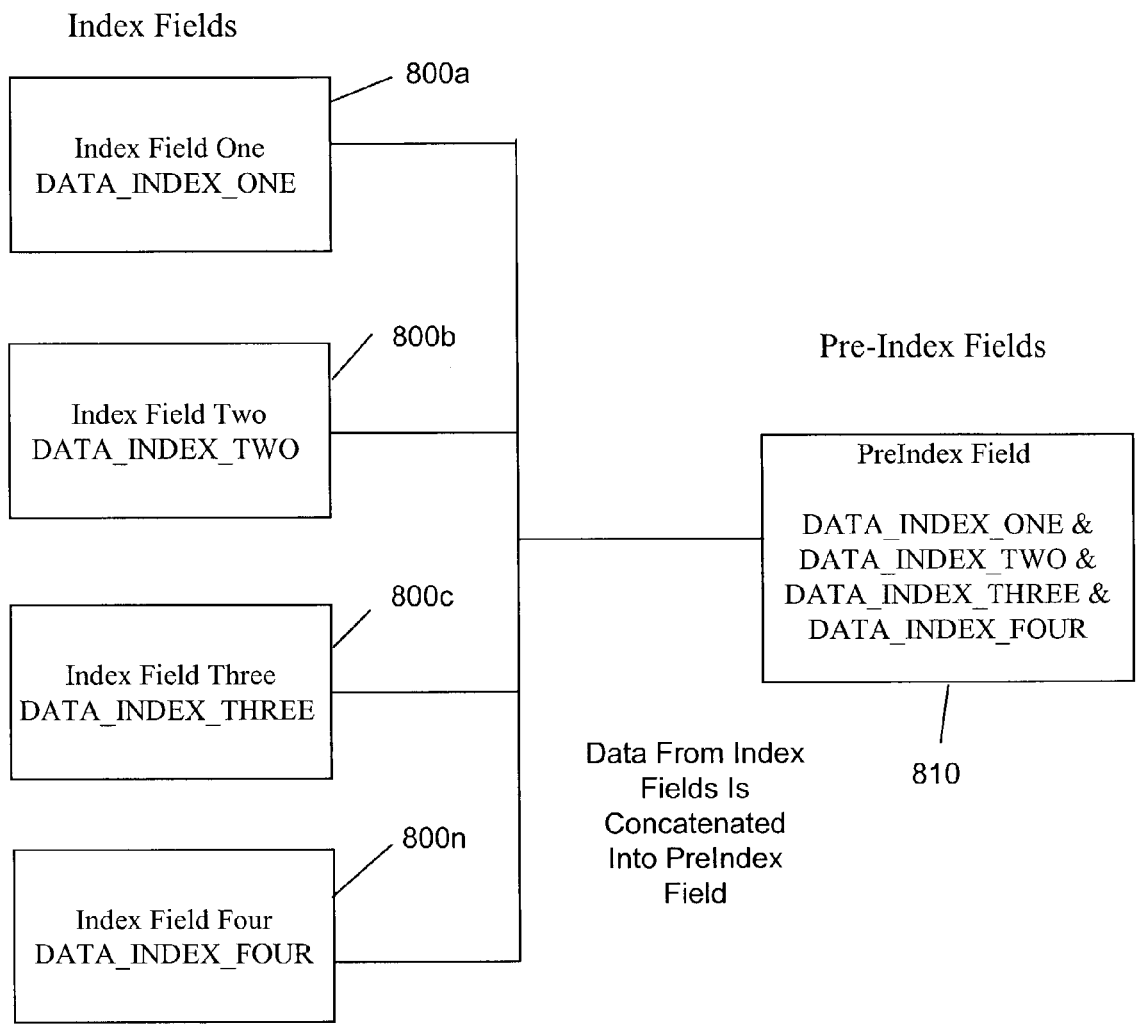
FIG. 8 is a diagram of a pre-index field according to an embodiment of the invention.

Therefore, in an aspect of the invention, the data entry application 500 pre-indexes (pre-loads), meaning that the application 500 assembles indexing data for searches before the data is searched. Typically, pre-indexing is the notion of indexing the data elements before they are needed for searching. Further, typically, pre-keying is the notion of assigning keys to fields used in the indexing before the fields are used for searching. More particularly, with reference to FIG. 3A, key shaped objects adjacent to some fields in some tables are key fields (indexes) for those tables and the database. In FIG. 3A, the field immediately below the key field can be a member of a group that is concatenated into a single searchable key field that makes up the pre-index field. FIG. 8 is a diagram of a pre-index field according to an embodiment of the invention. In FIG. 8, the data from index fields 800a-n are concatenated into the pre-index field 810. For example, the index fields 800a-n would correspond to the key fields (indexes) of the tables 310 in FIG. 3B.

Therefore, according to an aspect of the invention, the pre-indexing provides a "search index," which is defined as a unique data field and a text searchable concatenation of other fields' data in any given data table. Thus, when any words or combination of words (search terms) are input to the search engine 505, the search terms are compared to "indexes" for the tables in the database being searched. If the input search terms match same or similar data in the indexes, then searched data is located. Because of the unique field as part of the search index, the program 505 can very quickly locate data in related tables that is related to the data being requested or entered using any existing database engine search technology. By "pre-indexing" the primary (main or most often used search fields) into a single full text searchable key field, the search is more efficient and faster because the database engine has fewer places to call into memory and compare with the requested search terms/criteria. Further, because the description field 552 can comprise a description of the characteristics, features, and/or functions of an item of a subject (e.g., an electronic part description), data search can be substantially fast and intelligent when the description field is used as part of the pre-indexing. Further, all search indexes of a table can be concatenated into a single search index, thereby providing full text searches on all fields of the data model (i.e., a pre-index field can be formed by concatenating other index fields).

Advantageously, the "search index" of the present invention provides intelligent search keys as follows. Intelligent search keys can be defined as either a combination of key fields or separate key fields normalized according to normalization method 200 for the subject of the database system being implemented, such as strength, size, frequency, and duration key fields for a prescription drugs subject, or physical and/or electrical characteristic key fields for an electronic components subject. The "search index" process of the present invention is not dependent on any particular RDBMS technology platform and the "search index" process can be implemented using indexing services of any conventional RDBMS.

The "search index" accommodates a "pre-loaded" search capability, which can leverage the search facilities of any existing relational database search engine, as follows. This "pre-loaded" search capability is derived because of the "search index," which concatenates key fields based upon characteristics, features and/or functions of the subject modeled according to the normalization 200 into a single full-text searchable key field, thereby creating the "search index" making searches substantially more efficient and faster. Advantageously, "search index" processing is accomplished at the time of the initial data load for the data being entered into the database 510. Because there are no active searches querying the system during initial data load, ample processing resources are available to create a "search index" based upon keyed fields for searches and queries that are performed once the data is loaded to an online database engine 510. Further, the fields can be keyed dynamically for creation of the "search index" during data entry by selecting fields to be keyed.

Next, with reference to FIG. 4, operations of data search application 505 will be described. Both the search tool 505 and the data entry tool 500 are in communication with the same database layout 510, which is a data model designed according to the present invention. An aspect of the present invention provides reading, during data search (information retrieval), data of other fields and/or records in a database to automatically provide the data of the other fields and/or records. In particular, the present invention provides while entering search terms, search-ahead processing by searching the database for fields similar to or associated with entered search terms, to provide/locate data of the similar or associated fields, to offer search key suggestions, and/or to automatically correct field range errors in the search terms based upon the similar or associated fields, allowing intelligent information retrieval. Advantageously, combination of the search-ahead processing and the data model normalized with pre-defined ranges of acceptable field values (i.e., domain range reduction 205), substantially increase the speed, accuracy and validity of search results.

Thus, through comparison of database fields similar to input search terms, during data entry and data search, the invention not only can prevent inaccurate data entry, the invention can also ensure more accurate searches, using the same processes of domain range reduction 205 and/or validation measures 210 used by the data entry process 500 described above. More particularly, the search tool 505 is thought so that entered search terms for retrieving information are compared to fields containing data similar to the information based upon characteristics, features and/or functions of the information being searched. Therefore, if the search key specified a 200 grams (g) prescription of a substance when a normal range is 300 milligrams (mg), the invention can automatically correct such search request error and return results in the proper range.

Figure 9:
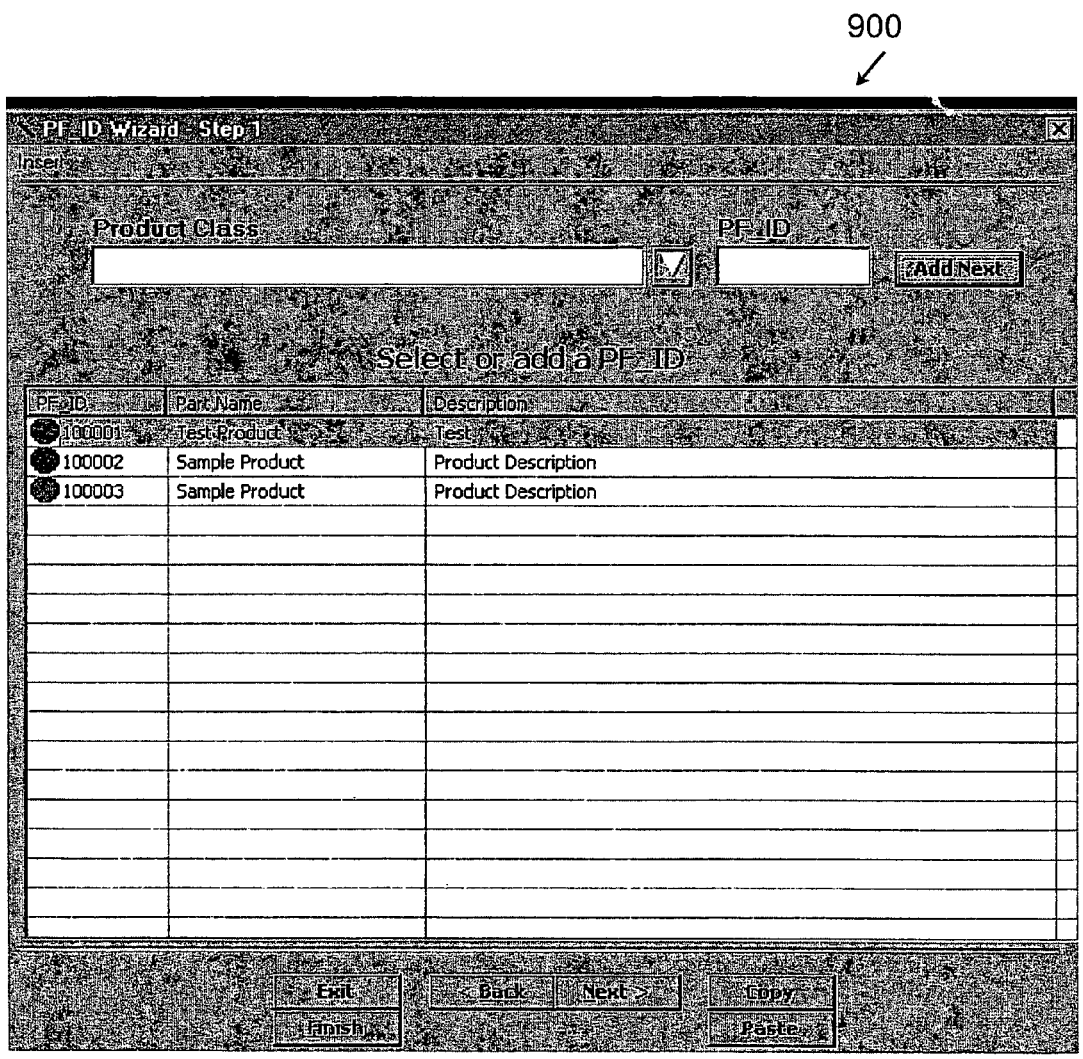
FIG. 9 is a display screen to start the data entry for items to be placed in a database according to an embodiment of the present invention.
Figure 10:
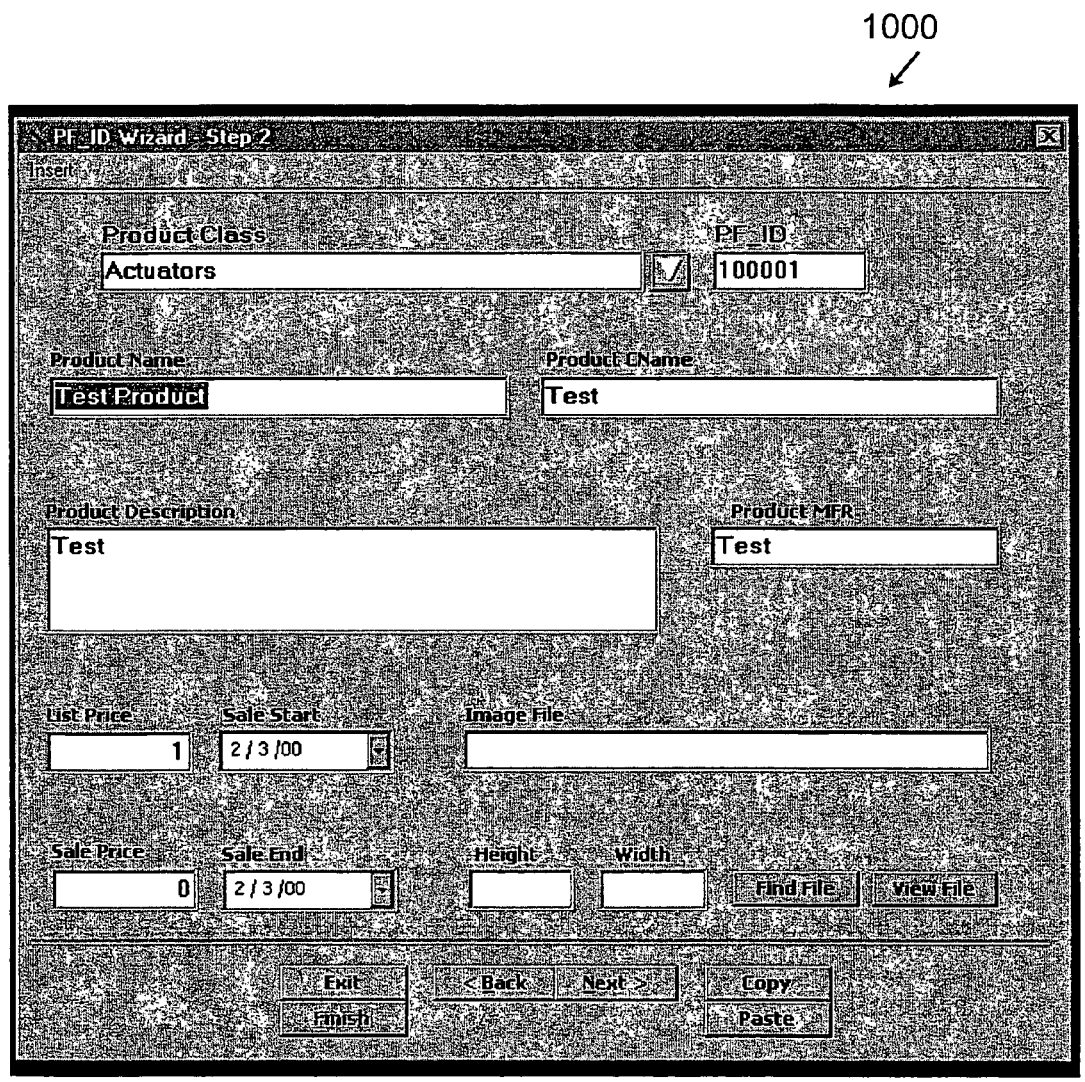
FIG. 10 is a display screen to start searching the database for similar items and pre-filling data elements for entry of the new item in FIG. 9.
Figure 11:
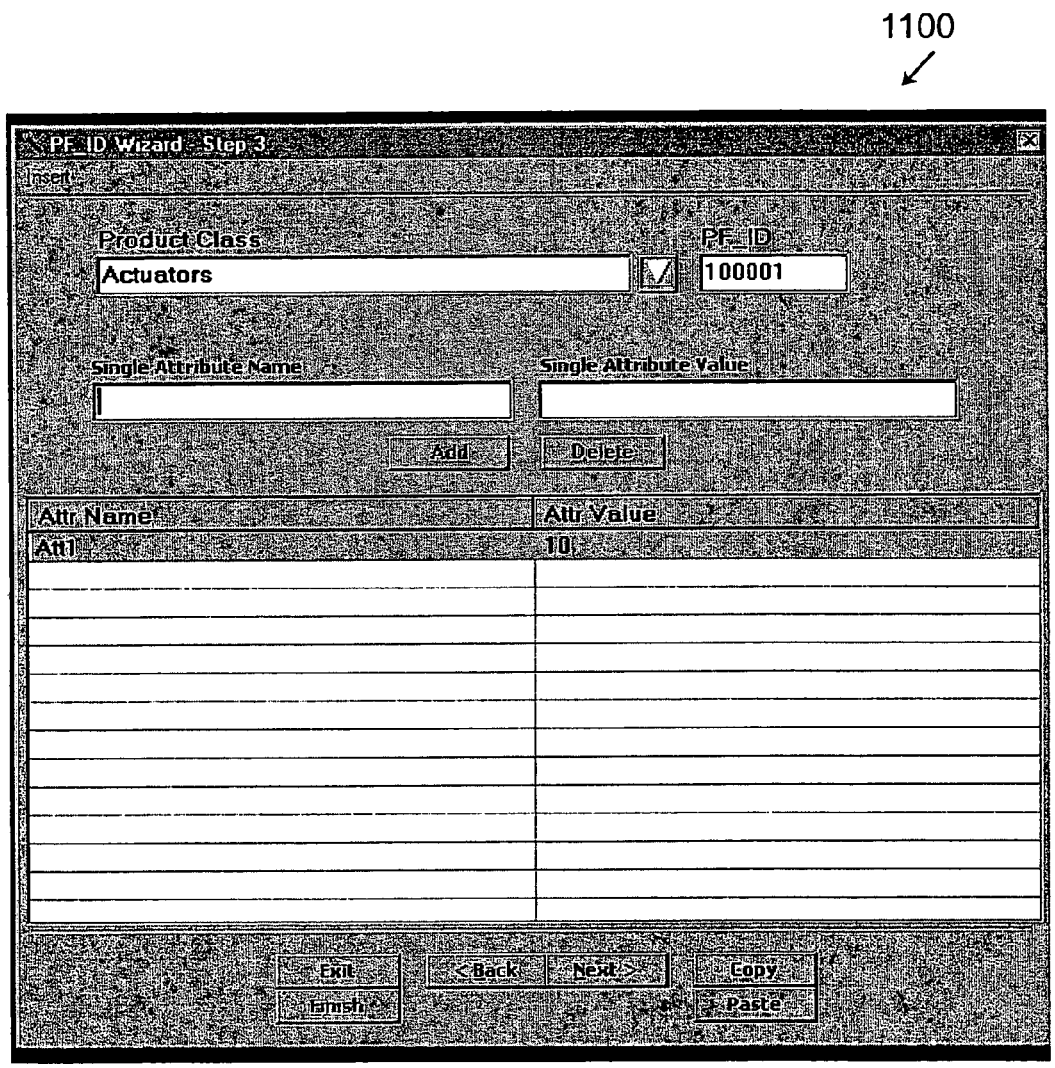
FIG. 11 is a display screen to add a new attribute to the new item being entered in FIG. 9
Figure 12:
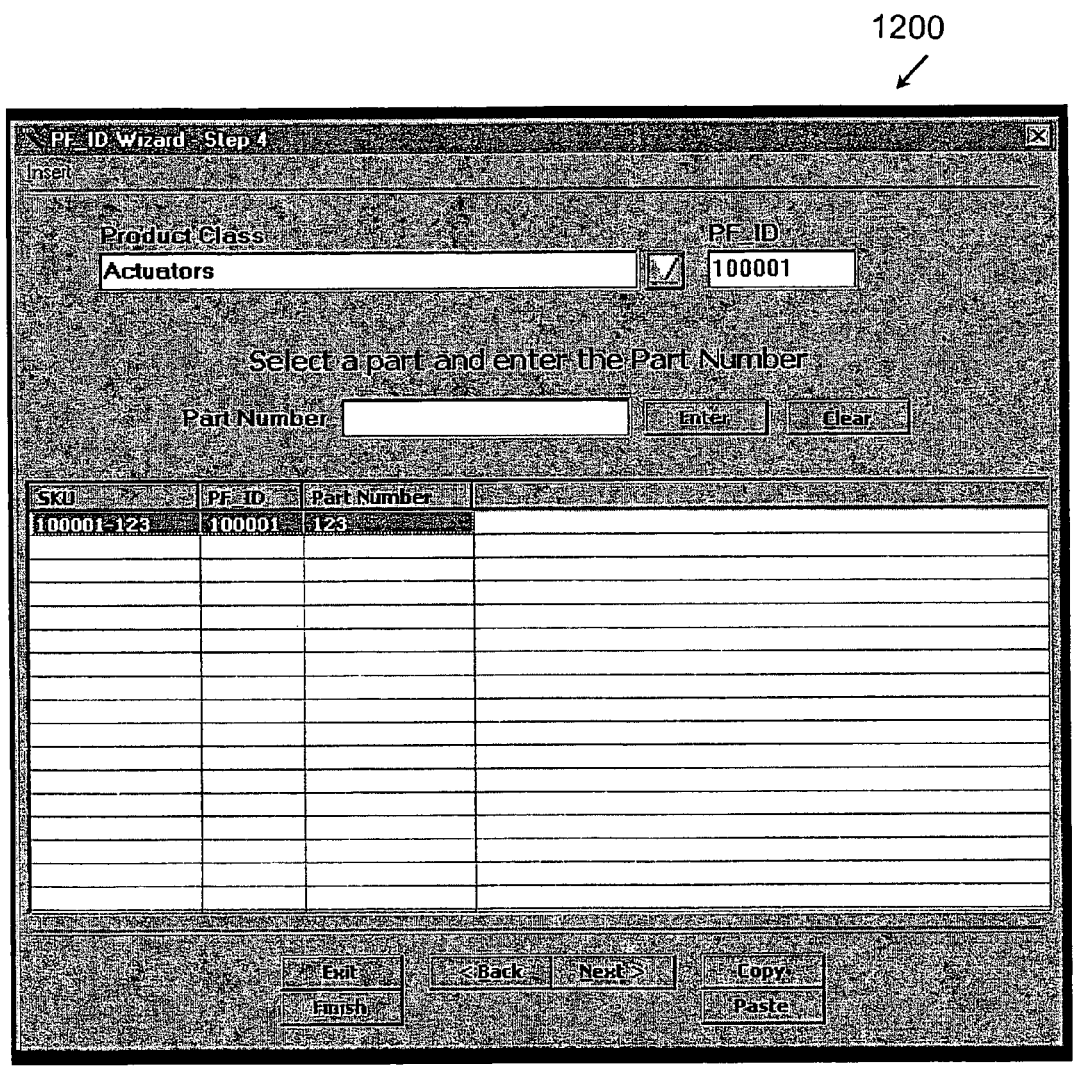
FIG. 12 is a display screen to select summary data to be concatenated for pre-constructing a full text search index of the database according to an embodiment of the invention.
Figure 13:
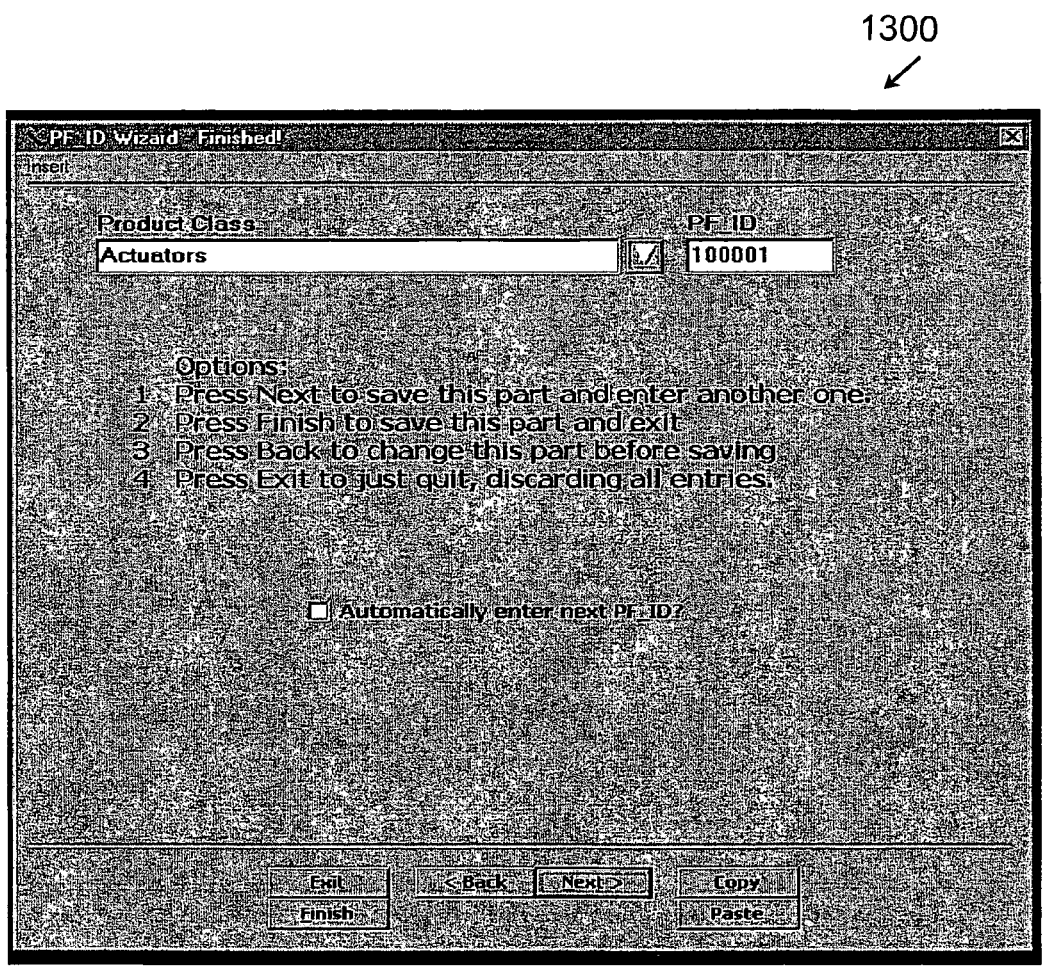
FIG. 13 is a display screen to complete the process of entering the new item in FIG. 9 into the database.

FIGS. 9 through 14 are example display screens of a data entry application 500 according to an embodiment of the present invention. In particular, the data entry program 500 comprises data entry display screens for as many layers and/or linked data tables required to describe a subject based on a data model design of the invention (i.e., describe the items being entered into the databases 510). FIG. 9 is a display screen 900 to start the data entry for items, such as electronic parts, to be placed in a database. FIG. 10 is a display screen 1000 to start searching the database for similar items and pre-filling data elements for entry of the new item in FIG. 9. FIG. 11 is a display screen 1100 to add an attribute (i.e., a characteristic/function/features) to the new item (e.g., an actuator) being entered in FIG. 9. FIG. 12 is a display screen 1200 to select summary data to be concatenated for pre-constructing a full text "search index" of the database. FIG. 5 shows some examples of fields which can be combined. FIG. 13 is a display screen 1300 to complete the process of entering the new item in FIG. 9 into the database. FIG. 14 is a display screen 1400 of search results by product name (e.g., a resistor) according to an embodiment of the present invention. Searches may be performed using any characteristics, features and/or functions of an item of a subject, such as in case of electronic parts a product manufacturer, a product description, and a manufacturer's part number. Searching using the product description field 552 based upon characteristics, features and/or functions of the item improves speed and accuracy of information search results based upon data from different data sources.

Figure 15:
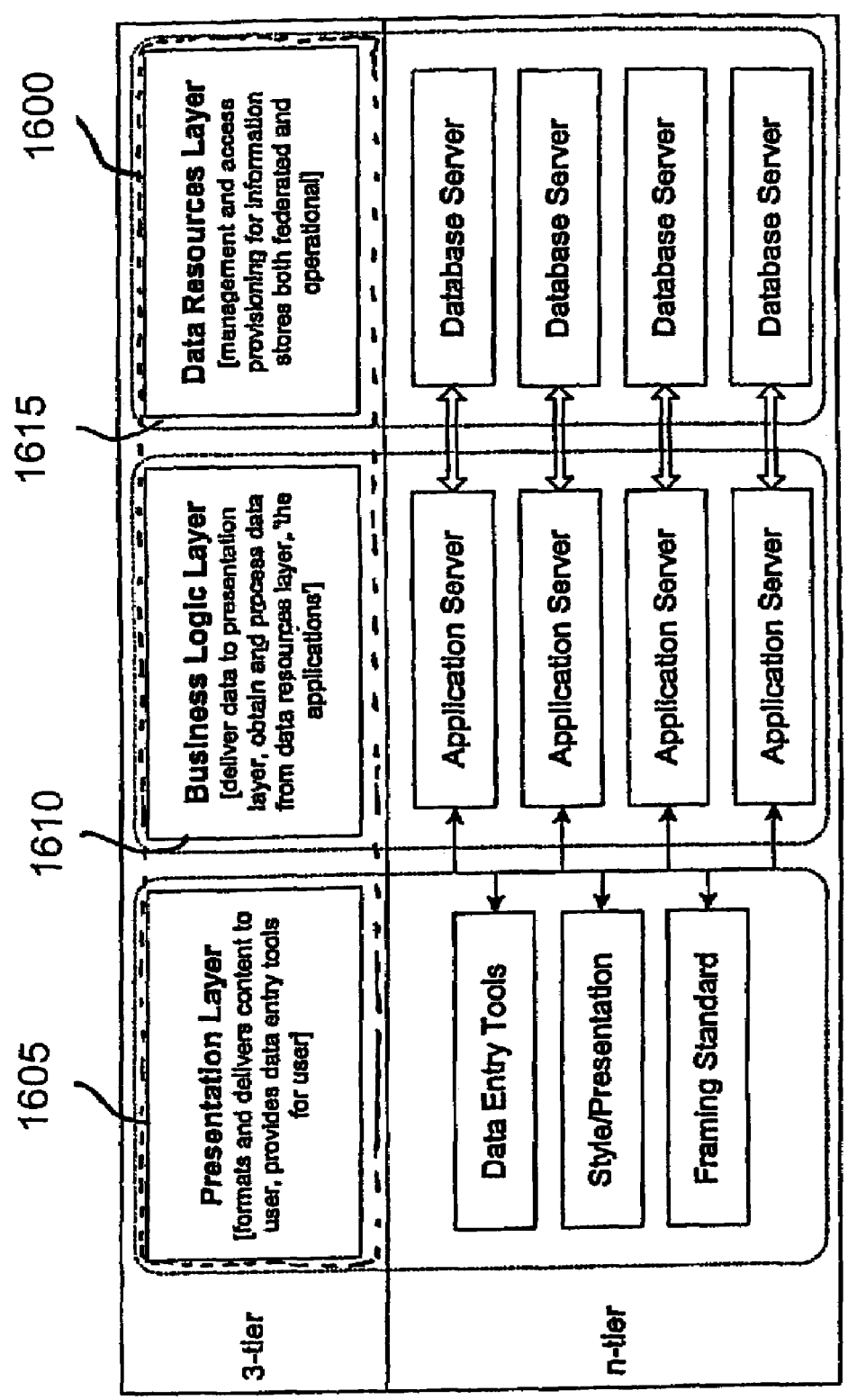
FIG. 15 is a block diagram illustrating scalability of processing layers according to an embodiment of the present invention.

FIG. 15 is a block diagram illustrating scalability of processing layers according to an embodiment of the present invention. In particular, processes 1600 of the invention can be segmented based upon functionality into presentation layer processes 1605, business logic layer (application) processes 1610 and data resources layer processes 1615. The n-tier layers at the presentation layer comprises data entry tools, style/presentation (user interfaces) and framing standards (data communication protocols), which interface with n application servers and n database servers. "Pre-loading" search data from several indexes and/or tables into a single search-able data stream can cause large processing loads on server software and/or hardware. To eliminate this problem the searching of the database and/or the "search index" creation ("pre-loading") are off loaded to one or more processors via operating system threads on any combination of one or more servers with two or more processors that execute a multi-processor operating system capable of dedicating processing threads to a given server processor.

Using this dedication technique to balance the server activity allows scaling the system to virtually any size database or dataset to be searched. In terms of scale a pair of servers with two or more processors each could easily handle several hundred simultaneous users and hundreds of thousands of data records. To increase the scope of this capability, more servers can be added to increase the systems overall capacity.

Further, the scalability of the processing layers allows designating every field of a record as a key, substantially simplifying data searches, substantially enhancing accuracy of database search results and/or substantially increasing database search speed (i.e., far beyond typical database functionality for very large data). In particular, every field of a record can be designated as key field to create the "search index" in a given RDBMS. Further, to search the tables, the present invention dynamically pre-constructs ("pre-loads") a single search repository of records that already contain all of the key searchable fields. This concatenation is performed at the time of data entry to minimize database server load during search requests. Additionally, full text search capabilities of any database engine can be leveraged in this manner, because during data entry there is ample time for the database engine to dynamically index the data for searches.

In FIG. 15, using such dedication technique to balance the server activity allows scalability of application programs to virtually any size database or dataset. In terms of processing scale, a pair of servers with two or more processors could easily handle several hundred simultaneous users and hundreds of thousands of data records. Therefore, adding more servers can increase system capacity to provide continued scalability and performance optimization, such as near instant search results by the search tool 505 and/or near instant domain suggestions during data entry by data entry tool 500. In particular, the present invention can be attained by dedicating to one or more processors, on any combination of one or more servers with two or more processors installed, processing threads associated with "pre-loaded" search processes and "index search" creation processes during automatic data entry according to the normalization 200.

In FIG. 15, scalability is derived from increasing the number of application and database servers. In case of any one server, the server operating system is dedicated to one processor and either the application or database services are dedicated to all remaining processors. In this fashion there is no limit to expansion capability of the scalability technology of the invention. Any server operating system and server hardware platform that are compatible with each other are suitable candidates for the scalability technology of the present invention.

Therefore, dedicating a processor to each software process 500 and/or 505 of the invention on a multi-processor machine increases the access speed of the data submissions as well as the search requests. Additionally, the dedication accommodates virtually unlimited scaling of a system 100 to accommodate larger and larger subjects and faster delivery speeds. Dedicating one or more processors to a database engine allows for more rapid delivery of search requested content by ensuring that the database engine is loaded in memory and has instant access to a processor to perform its functions.

The normalization phase 200 can change over time as a function of changes in characteristics, features and/or functions of the item category modeled. Typical normalization methods only seek to minimize duplication and inconsistencies from a single data source, such as data of a single enterprise, by breaking down tables. The normalization phase 200 can further maximize data integrity for data from multiple data sources far beyond the traditional normalization by applying varying dynamic redundancy reduction processes 202, 205 and/or 210 to design, create and maintain an expert data model, thereby providing unified information on a subject. For example, the present invention's normalization phase 200 not only can ensure that data is not entered more often than necessary but that entered data is initially (automatically and/or manually) and continuously (automatically and/or manually) within a normally acceptable range, maximizing data integrity and allowing a cross product/subject reference database system.

The present invention can be used to provide a commercial product and/or service dynamically unifying data from different sources for fast and accurate information retrieval. For example, a dynamic Competitor Product Cross Reference System (CRS) can be developed in response to demand for a unified electronic parts and components information source for design engineers. Inefficiencies associated with the need for engineers to search through a myriad of cumbersome, sometimes conflicting, sources for key technical information required for the design of new electronic products leads to a critical rate-limiting problem in the process of bringing new products to market.

In contrast to typical electronic parts and components CRS products currently available or under development, a CRS normalized according to the normalization 200 balances rapid information access with systematic statistical quality control (SQC) and cross product-class linkage. Because unified data for a given item category is typically in the tens-of-millions, the present invention also provides a system for index (parameter) searches, for example, for a SQL-server, that dramatically reduces the time needed to accomplish a search. Further, by dedicating processors (CPUs) to the various normalization 200 processes, the invention provides an efficient server configuration so that all requested parts information can be made available to any number of anticipated simultaneous design engineers.

More particularly, the normalization 200 incorporates a tiered SQC for both initial data input (automatic and/or manual), and database maintenance. For initial data input, whether derived from existing datasets or primary keypunch efforts, data can have predictable classes of errors. Error correction can involve tiered referral to intervention (including primary source validation and/or correction) based on the class of error found. Ongoing SQC after initial data intake involves systematic search strategies for discovering and correcting both errors (for example, misspelling) and updates (for example, changes in company ownership). The SQC has been designed with the clear recognition that sources of information about errors and updates are variable and dynamic. Critically, this system allows changes in information sources and provides incentives for acceptance of input from the true experts, such as design engineers in case of electronic parts.

An effective CRS provides information across products. The normalization 200 provides linked and indexed data structures that allow for a variety of parametric searches. For example, in case of electronic parts, in addition to the usual simple product characteristics (part type/current/power/resistance/color/materials, etc.) and manufacturer characteristics (name/location/contacts, etc.), a CRS of the invention allows searches by equivalency (for example, 10 ohm resistors that can all be used in a given shape or board configuration), prioritized equivalency (ordered by best option, where performance characteristics are varied or sources are constrained by preferred-source contracts), required association (one part needs a specific connector to function), or incompatibility (by performance or policy criteria). As a cross-product linkage example, a tabled system for premade assemblages of parts and components is developed for search or investigation.

The combination of rapid access, systematic SQC, and broad cross-product linkage makes a CRS created according to the normalization 200 the state-of-the-art in item-category cross reference systems. An example online service and/or product using electronic components will be described next. To avoid reliance on hard copy catalogs, published CD-ROMs and multiple company Web sites by component sales representatives, which are all typically difficult to use because they represent a variety of interfaces to a user, typically updated infrequently and inconsistent, the normalization 200 can provide comprehensive, web based, electronic catalog containing all electronic components produced in the world. Finding necessary parts will be easy, cheap, and vastly speed up the processes of both design and manufacture. The service can automate the entire procurement process (see FIG. 16), allowing all authorized procurement participants (user types) to utilize the same on-line forms to complete various types of component transactions (entry, update, search) within a secure environment, thus eliminating duplication of effort that currently exists at all stages in the process.

According to an embodiment of the invention, a database of electronic components, which are produced by many manufacturers, can be provided. Part number, technical specification, and photographs would list these parts where appropriate. This data can come, for example, from thousands of existing websites, via "specially trained" Web spiders (i.e., data entry applications 500) based upon the normalization 200. Data can also be incorporated from catalogs, CD-ROMs, trade shows, verbal communication and manufacturers that typically provide new data. The database service can provide complete multi-source supply management solutions for the electronics component industry, including product identification, procurement, lead time and availability for companies using the system. Each user, from a single engineer looking for a part to a company looking for improved vendor communications, can gain significant value in using the service.

Figure 16:
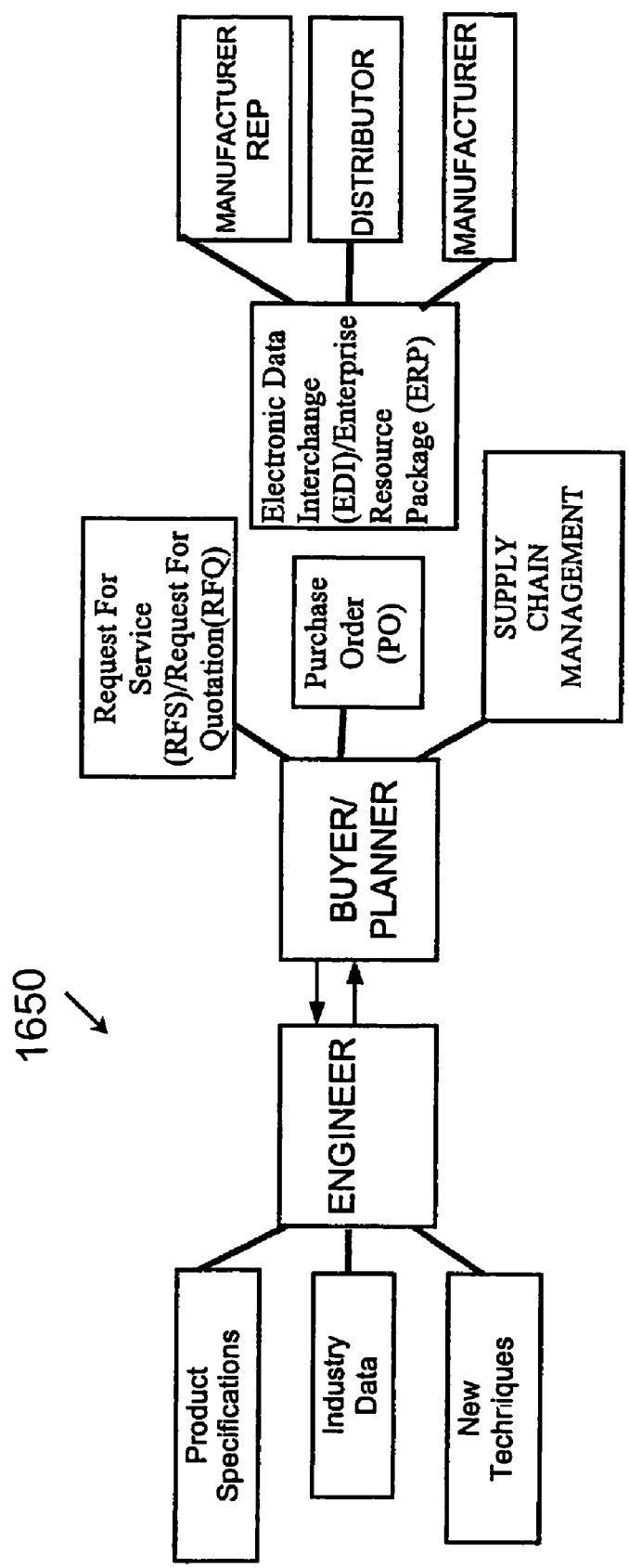
FIG. 16 is a block diagram of a procurement chain business model to procure electronic parts according to an embodiment of the invention.

FIG. 16 is a block diagram of a procurement chain business model 1650 to procure electronic components according to an embodiment of the invention. A cross-reference system designed, populated and maintained based upon the normalization 200, can efficiently interface members of the electronic component procurement chain to develop electronic products. In FIG. 16, the present invention can interface buyers/planners, engineers, quality assurance personnel, and component manufacturer sales and marketing individuals.

Accordingly, a cross-reference system normalized according to the normalization 200 provides unified data, thereby electronically interfacing implementers (e.g., engineers), buyers/planners/designers and manufacturers (e.g., sales representatives, distributors). In particular, the present invention unifies existing data of a target industry (a subject) from existing sources of the data to electronically interface different user segments (types) of the subject, such as (without limitation) implementers, buyers/planners/designers and manufacturers of the subject.

An intelligent web crawler (a database transformation application 515) reads each manufacturer or distributor web site to download the data from their web site. The web crawler is programmed with the Internet address for each manufacturer or distributors web site. It is then programmed with a schedule or interval to download the information available on that web site. The web crawler 'pulls' all of the data available from the manufacturer or distributors web site and places it into directories within a central web site (cross reference system), such as a web site developed and managed by ElecDECom assignee of the present invention. This data is then 'indexed' using the invention's content index and 'parsed' into the database 510 using a web site parser.

The web parser is a database transformation 515 component that converts the web site data brought in from manufacturers and vendors web sites. This component translates the data from each 'crawled' web site into a format suitable for entry into the database 510, which is a normalized data model based upon the normalization 200. The web crawler component can automatically keep a cross reference service current by allowing the web parser to dynamically apply the domain-range reduction 205 and the validation measures 210.

The content index is a component, which allows full text searching of all pages and data in the central web site directories as well as all data in the database 510. Typically, the 'content index' is comprised of two parts. The first part maintains the full content indexing of all data in the central web site. This includes all data and pages brought in by the web crawler and the pages and data that are the central web site and user/GUI. The second part maintains the full text indexing of all data in the database 510 (i.e., the 'search index'). This includes descriptions, numbering, and all part/component technical specifications. Both parts operate in fully automated unattended mode. As items are added to either the central web site or the database 510 the content index automatically updates its structures to include the new data. The normalization 200 allows incorporation of varying searching for data access, for example, via part name and component, via a product name, generic name and common name, and via a full text search of all of the words and phrases in the database. Such varying search options allows users to locate information without manufacturer name, only knowing a piece of the part name or even just its common reference, or only known some of required specifications.

Such varying search options allow creation and maintenance of plan lists using the searched parts. A plan list is where many parts can be listed for reference throughout a project. The plan list can be closed and saved for future reference, and a historical listing of all closed plan lists can also be made available. Further, application assistance can be provided based upon input and/or provided sample forms to build an electronic product using the electronic components listed in the database. Accordingly, with a single input operation, such as a mouse click, a sample design/build form corresponding to an electronic product can give a significant head start to finalize design, contact procurement chain and procure electronic parts, thereby providing a one stop electronic shop for design engineers and manufacturers to electronically transact business and/or generate leads of new business. Of course, the present invention can be used to provide other one stop electronic shops of other target industries characterized by the use of items (e.g., parts, information) from two or more sources to build a product and/or to offer services.

The database 510 is the component that stores unified data of a target industry, such as electronic components. A standard SQL database server can be used. The database schema and data table structures are built using existing database server software and development tools based upon the data normalization 202. The database 510 component will be connected to the content index component to allow full text searching of all fields in all tables in all databases. The User/GUI component will be connected to the content index to allow users of the central web site to perform highly structured and targeted searches of all data available.

All database components are 100% scaleable with no practical size limitations. The database 510 is programmed to scale to multiple servers and multiple sites with automatic update. Data entry can be from all sources and can be conducted both on-line and on-network.

The user interface 530 (see FIG. 4) is the component that provides the user interface to the central web site services. This is the 'front end' for all the other components. The central web site service provides simple point and click access to any feature, as well as an intuitive feel for each type of user. Accordingly, the user interface 530 provides an data entry interface for one type of user, a search interface for another type of user, a quality assurance interface for yet another type of user. The user interface 530 is designed based upon extensively profiling user types as well as individual users and cross-referencing the types and users to incorporate the users in the normalization 200 as data sources as well as users.

Because the database would also provide data about various user segments of the target industry, in case of electronic parts, design engineers, manufacturers and distributors can interface via contact information of the user segments corresponding to the parts. Further, the cross reference system of the invention tracks and references multiple communications among thousands of users. Further, the cross reference system maintains proper accounting of each communication (transmission) for both billing and to continuously improve the resources available for the user. Further, the cross reference system can track extensive sales and marketing records for advertising and/or sales. Accordingly, the cross reference system can continuously and "intelligently" add features to each individual's profile to consistently build value for the user (and gain loyalty).

The many features and advantages of the present invention are apparent from the detailed specification and thus, it is intended by the appended claims and their equivalents to cover all such features and advantages of the system which fall within the true spirit and scope of the invention. Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of designing a data model, comprising:
   heuristically collecting information relating to characteristics, features and/or functions of items in a category;
   generating computer implemented data elements describing the characteristics, features and/or functions of the items in the category, according to the heuristically collected information of the items in the category;
   defining a domain of each data element as all possible valid values for each data element, based upon the characteristics, features and/or functions of the items in the category;
   applying varying data integrity methods as normalization of a domain of the items in the category by adjusting, including adding and/or removing, data elements, or adjusting the domain of the data elements, or any combinations thereof, according to a process including:
      adding data elements shared by the items in the category based upon the characteristics, features and/or functions of the items,
      assigning constraints for the data elements based upon the characteristics, features and/or functions of the items in the category,
      reading electronic data and automatically generating the data elements describing the characteristics, features and/or functions of the items by interactively querying users for information about the characteristics, features and/or functions of the items as a heuristic method to automatically generate the data elements based upon responses to the queries, and after entry of data into a data element, searching data of other fields containing data similar or same as the entered data and automatically suggesting the similar or the same data, allowing a user to verify correct domain value entry for the data element;

dynamically constructing, based upon the characteristics, features and/or functions of the category of items, a search index during entry of data into the data elements; and searching the data elements via the search index to provide a search result by comparing input search terms to the index.

2. The method of claim 1, wherein the items are electronic parts and components.

3. The method of claim 1, wherein the items are medical prescription drugs.

4. The method of claim 1, wherein the items are Internet address data.

5. The method of claim 1, wherein the data integrity methods are applied dynamically to continually preserve a data integrity level of the data model.

6. The method of claim 1, further comprising automatically completing the other fields of the record being entered with the similar or same data.

7. The method of claim 1, further comprising determining the similar or same data based upon the characteristics, features and/or functions of the data.

8. The method of claim 1, wherein the searching the data of other fields comprises a plurality of search processes and the method further comprises assigning each of two or more search processes to a computer processor in a multi-processor system to perform each searching for the similar or same data.

9. The method of claim 1, further comprising searching for the similar or same data during the searching with search terms to automatically suggest other similar search terms.

10. A method of unifying existing data of a target industry from existing sources of the data, comprising:

heuristically collecting information relating to characteristics, features and/or functions of items in a target industry;

generating computer implemented data elements describing the characteristics, features and/or functions of the items in the target industry, according to the heuristically collected information of the items in the target industry;

defining a domain of each data element as all possible valid values for each data element, based upon the characteristics, features and/or functions of the items in the target industry;

applying varying data integrity methods as normalization of a domain of the items in the target industry by adjusting, including adding and/or removing, data elements, or adjusting the domain of the data elements, or any combinations thereof, according to a process including:

adding data elements shared by the items in the target industry based upon the characteristics, features and/or functions of the items, assigning constraints for the data elements based upon the characteristics, features and/or functions of the items in the target industry, reading electronic data and automatically generating the data elements describing the characteristics, features and/or functions of the items by interactively querying users for information about the characteristics, features and/or functions of the items as a heuristic method to automatically generate the data elements based upon responses to the queries, electronically reading, parsing and transforming data from existing electronic data sources of the target industry to input to the data element, and after entry of data into a data element, searching data of other fields containing data similar or same as the entered data and automatically suggesting the similar or the same data, allowing a user to verify correct domain value entry for the data element;

designing user interfaces to the data model, the user interfaces corresponding to user segments of the target industry;

dynamically constructing, based upon the characteristics, features and/or functions of the category of items, a search index during entry of data into the data elements; and searching the data elements via the search index to provide a search result by comparing input search terms to the index; and dynamically maintaining the normalization of the data model according to the varying data integrity methods during any type of access to the data model by the user segments, thereby electronically interfacing different user segments of the target industry.

11. The method of claim 10, wherein a data entry access to the data model comprises dynamically constructing search indexes, each search index defined as a unique data field and a text searchable concatenation of other fields' data in any given data table of the data model.

12. The method of claim 11, further comprising allocating to a processor a process of the data entry access and construction of the search indexes.

13. The method of claim 11, wherein during the data entry of a record, data input by a user is compared to the same or similar data in the search indexes to pre-fill other data in the record, thereby providing dynamic normalization.

14. The method of claim 11, wherein the normalization is dynamically maintained via intelligent data entry and intelligent search keys based upon the characteristics, features and/or functions of the items in the target industry.

15. An apparatus for designing a data model, comprising:

a programmed processor, heuristically collecting information relating to characteristics, features and/or functions of items in a category, generating computer implemented data elements describing the characteristics features and/or functions of the items in the category, according to the heuristically collected information of the items in the category, defining a domain of each data element as all possible valid values for each data element, based upon the characteristics, features and/or functions of the items in the category, applying varying data integrity methods as normalization of a domain of the items in the category by adjusting, including adding and/or removing, data elements, or adjusting the domain of the data elements, or any combinations thereof, by:

adding data elements shared by the items in the category based upon the characteristics, features and/or functions of the items, assigning constraints for the data elements based upon the characteristics, features and/or functions of the items in the category, reading electronic data and automatically generating the data elements describing the characteristics, features and/or functions of the items by interactively querying users for information about the characteristics, features and/or functions of the items as a heuristic method to automatically generate the data elements based upon responses to the queries, and after entry of data into a data element, searching data of other fields containing data similar or same as the entered data and automatically suggesting the similar or the same data, allowing a user to verify correct domain value entry for the data element, dynamically constructing, based upon the characteristics, features and/or functions of the category of items, a search index during entry of data into the data elements, and searching the data elements via the search index to provide a search result by comparing input search terms to the index.

16. An apparatus for designing a data model, comprising:

means for heuristic collection of information relating to characteristics, features and/or functions of items in a category for a target industry;

means for generating computer implemented data elements describing the characteristics, features and/or functions of the items in the category, according to the heuristically collected information of the items in the category;

means for defining a domain of each data element as all possible valid values for each data element, based upon the characteristics, features and/or functions of the items in the category;

means for applying varying data integrity methods as normalization of a domain of the items in the category by adjusting, including adding and/or removing, data elements, or adjusting the domain of the data elements, or any combinations thereof, using:

means for adding data elements shared by the items in the category based upon the characteristics, features and/or functions of the items, means for assigning constraints for the data elements based upon the characteristics, features and/or functions of the items in the category, means for reading electronic data and automatically generating the data elements describing the characteristics, features and/or functions of the items by interactively querying users for information about the characteristics, features and/or functions of the items as a heuristic method to automatically generate the data elements based upon responses to the queries, and means for after entry of data into a data element, searching data of other fields containing data similar or same as the entered data and automatically suggesting the similar or the same data, allowing a user to verify correct domain value entry for the data element, and means for dynamically maintaining the normalization of the data model according to the varying data integrity methods during any type of access to the data model by different user segments of the target industry, thereby electronically interfacing the different user segments of the target industry;

means for dynamically constructing, based upon the characteristics, features and/or functions of the category of items, a search index during entry of data into the data elements; and means for searching the data elements via the search index to provide a search result by comparing input search terms to the index.

\* \* \* \* \*